(12) United States Patent
Tsai et al.

(10) Patent No.: US 8,537,474 B1
(45) Date of Patent: Sep. 17, 2013

(54) IMAGING LENS SYSTEM

(75) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/540,981

(22) Filed: Jul. 3, 2012

(30) Foreign Application Priority Data

Mar. 21, 2012 (TW) .............................. 101109619 A

(51) Int. Cl.
*G02B 9/12* (2006.01)
*G02B 3/02* (2006.01)

(52) U.S. Cl.
USPC ......................................................... 359/716

(58) Field of Classification Search
USPC ......................................... 359/708, 713–716
See application file for complete search history.

(56) References Cited

U.S. PATENT DOCUMENTS

| 7,525,741 | B1 | 4/2009 | Noda |
| 7,564,635 | B1 | 7/2009 | Tang |
| 7,692,874 | B2 * | 4/2010 | Amanai et al. ................. 359/716 |
| 2011/0310493 | A1 * | 12/2011 | Park et al. ...................... 359/708 |

* cited by examiner

*Primary Examiner* — Darryl J Collins
(74) *Attorney, Agent, or Firm* — Morris Manning & Martin LLP; Tim Tingkang Xia, Esq.

(57) ABSTRACT

This invention provides an imaging lens system in order from an object side to an image side comprising: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof. Additionally, the central thickness of the second lens element is controlled favorably for the efficient spatial arrangement of the lens assembly and the simpler individual lens production while maintaining suitable thickness of the second lens element, thereby assuring image quality and improving yield rate of the product.

23 Claims, 22 Drawing Sheets

IMAGING LENS SYSTEM

CROSS-REFERENCE TO RELATED APPLICATIONS

This non-provisional application claims priority under 35 U.S.C. §119(a) on Patent Application No. 101109619 filed in Taiwan R.O.C on Mar. 21, 2012, the entire contents of which are hereby incorporated by reference.

BACKGROUND

1. Technical Field

The present disclosure relates to an imaging lens system, and more particularly, to a compact imaging lens system used in electronic products or an imaging lens system in three-dimensions imaging.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional compact photographing optical lens assembly, in order to reduce manufacturing costs, is usually composed of a two-lens structure, such as a two-lens imaging lens assembly disclosed by U.S. Pat. No. 7,525,741. However, two-lens structure has limited ability in correcting aberrations, which is unable to satisfy the demand of high level imaging modules. On the other hand, utilizing too many lens elements in the assembly will also be difficult for the total track length of the lens assembly to stay compact.

To obtain high image quality while maintaining the compact feature of the lens assembly, photographing optical lens assembly with three lens elements proves to be the solution. U.S. Pat. No. 7,564,635 discloses a photographing optical lens assembly with three lens elements. However, three lens elements of the lens assembly are all positive refractive lens elements, which make it difficult to correct the aberration (such as chromatic aberration) in the system and the image quality is compensated. Therefore, a need exists in the art for a photographing optical lens assembly that features high image quality without having a long total track length and applicable in portable electronic products.

SUMMARY

By the following disclosed arrangement, the imaging lens system of the invention makes the central thickness of the second lens element more favorable for not only the efficient spatial arrangement of the lens assembly but also the simpler individual lens production while assuring suitable thickness of the second lens element, thereby assuring image quality and improving yield rate of the product.

The present disclosure provides an imaging lens system comprising, in order from an object side to an image side: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof; wherein there are three lens elements with refractive power in the imaging lens system; the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an axial distance between the second lens element and the third lens element is T23, and they satisfy the following relations: $0.35<CT1/CT2<1.00$; $0.35<CT3/CT2<1.00$; $-3.0<(R1+R2)/(R1-R2)<0$; and $0.65<T23/CT3<1.80$.

On the other hand, the present disclosure provides an imaging lens system comprising, in order from an object side to an image side: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof; wherein there are three lens elements with refractive power in the imaging lens system; the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an axial distance between the first lens element and the second lens element is T12, an axial distance between the second lens element and the third lens element is T23, and they satisfy the following relations: $0.35<CT1/CT2<1.00$; $0.35<CT3/CT2<1.00$; $-3.0<(R1+R2)/(R1-R2)<0$; and $0.5<T12/T23<1.55$.

Furthermore, the present disclosure provides an imaging lens system comprising, in order from an object side to an image side: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof; wherein there are three lens elements with refractive power in the imaging lens system; the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an Abbe number of the second lens element is V2, and they satisfy the following relations: $0.35<CT1/CT2<1.00$; $0.35<CT3/CT2<1.00$; $-3.0<(R1+R2)/(R1-R2)<0$; and $15<V2<24.5$.

In the aforementioned imaging lens system, the first lens element has positive refractive power and thereby can provide the main refractive power that the system needs, which is favorable for reducing the total track length of the imaging lens system. The second lens element has negative refractive power so that the aberration generated by the first lens element having positive refractive power and the chromatic aberration of the system can be favorably corrected. The third lens element has negative refractive power so that the principal point of the optical system can be positioned away from the image plane and thereby reducing the total optical track length of the system for keeping the lens compact In the aforementioned imaging lens system, the second lens element is a meniscus lens element with a concave object-side surface and a convex image-side surface so that the aberration generated by the first lens element and the astigmatism of the system can be corrected favorably. When the third lens element is a meniscus lens element with a convex object-side surface and a concave image-side surface, it facilitates the correction of the astigmatism and high order aberrations of the system. In addition, when at least one inflection is formed on the third lens element, the incident angle of light projecting onto the image sensor from the off-axis field can be effectively reduced so that the sensing efficiency of the image sensor can be improved and the off-axis aberration can be corrected.

DETAILED DESCRIPTION OF THE PREFERRED EMBODIMENTS

Figure 1A:
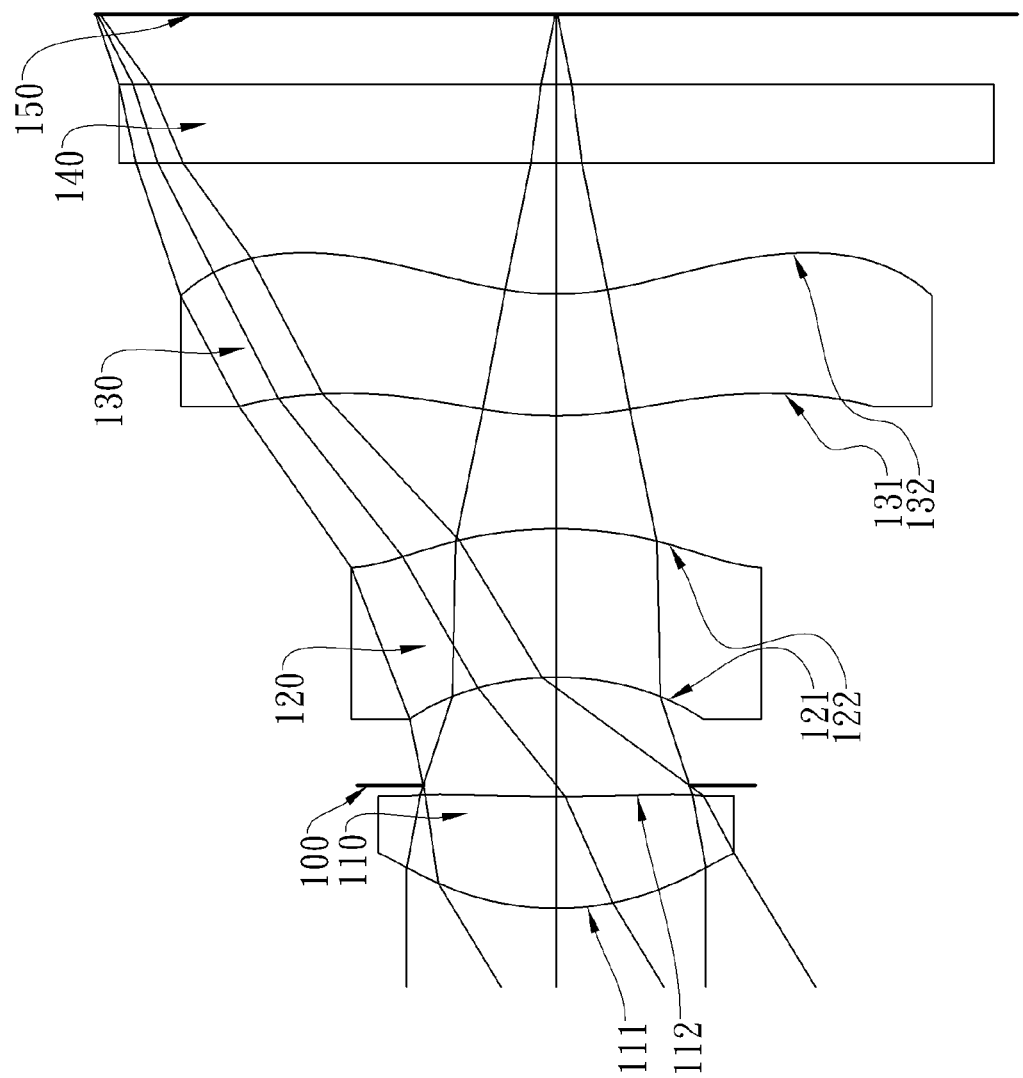
FIG. 1A shows an imaging lens system in accordance with a first embodiment of the present disclosure.

The present disclosure provides an imaging lens system comprising, in order from an object side to an image side: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof; wherein there are three lens elements with refractive power in the imaging lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an axial distance between the second lens element and the third lens element is T23, and they satisfy the following relations: $0.35<CT1/CT2<1.00$; $0.35<CT3/CT2<1.00$; $-3.0<(R1+R2)/(R1-R2)<0$; and $0.65<T23/CT3<1.80$.

When the relations of $0.35<CT1/CT2<1.00$ and $0.35<CT3/CT2<1.00$ are satisfied, the central thickness ratio of the first lens element and the second lens element and the central thickness ratio of the second lens element and the third lens element are more appropriate for not only the efficient spatial arrangement of the lens assembly but also the simpler individual lens production while assuring suitable thickness of the second lens element, thereby assuring image quality and improving yield rate of the product; preferably, the following relations are satisfied: $0.50<CT1/CT2<0.94$ and $0.50<CT3/CT2<0.94$.

When the relation of $-3.0<(R1+R2)/(R1-R2)<0$ is satisfied, the spherical aberration of the system can be corrected favorably; preferably, the following relation is satisfied: $-2.5<(R1+R2)/(R1-R2)<-0.5$.

When the relation of $0.65<T23/CT3<1.80$ is satisfied, the distance on the axis between the second and the third lens elements and the thickness of the third lens element can be effectively controlled, which is not only favorable for more efficiency in space arrangement of lens elements, for keeping the lens system compact.

When the greatest central thickness is the second lens element among the three lens elements of the imaging lens system, the thickness of the lens elements of the lens system can be then arranged more appropriately and provided the simpler individual lens production while assuring suitable thickness of the second lens element, and thereby not only improving the moldability and homogeneity of the plastic-injection-molded lenses, but also achieving good image quality of the imaging lens system.

In the aforementioned imaging lens system, a focal length of the imaging lens system is f, a focal length of the third lens element is f3, and they preferably satisfy the following relation: $-0.45<f/f3<0$. When the above relation is satisfied, the refractive power of the third lens element can be avoided from becoming too large, which can reduce the aberration in the imaging lens system and the sensitivity of the system.

In the aforementioned imaging lens system, the system further comprising a stop, an axial distance between the stop and the image-side surface of the third lens element is Sd, an axial distance between the object-side surface of the first lens element and the image-side surface of the third lens element is Td, and they preferably satisfy the following relation: 0.65<Sd/Td<0.90. When the above relation is satisfied, a good balance between telecentricity and wide field of view can be achieved.

In the aforementioned imaging lens system, a focal length of the second lens element is f2, the focal length of the third lens element is f3, and they preferably satisfy the following relation: 0<f2/f3<0.75. When the above relation is satisfied, the refractive power of the second lens element and the third lens element are more balanced for correcting the aberration and reducing the sensitivity.

In the aforementioned imaging lens system, an axial distance between the first lens element and the second lens element is T12, an axial distance between the second lens element and the third lens element is T23, and they preferably satisfy the following relation: 0.5<T12/T23<1.55. When the above relation is satisfied, the space between lens elements of the lens system is proper, which is not only favorable for more efficiency in space arrangement of lens elements, for keeping the lens system compact.

In the aforementioned imaging lens system, the focal length of the imaging lens system is f, the focal length of the second lens element is f2, and they preferably satisfy the following relation: −0.70<f/f2<−0.25. When the above relation is satisfied, the refractive power of the second lens element is more appropriate. This feature allows aberrations produced by the first lens element to be corrected favorably while preventing the refractive power of the second lens element from becoming too large, so that the sensitivity of the system can be favorably reduced.

In the aforementioned imaging lens system, a curvature radius of the image-side surface of the third lens element is R6, the focal length of the imaging lens system is f, and they preferably satisfy the following relation: 0.1<R6/f<0.6. When the above relation is satisfied, suitable refractive power can be obtained by the configuration of the curvature radius of the image-side surface of the third lens element, and thereby the aberration of the system can be favorably corrected.

In the aforementioned imaging lens system, an Abbe number of the second lens element is V2, and it preferably satisfies the following relation: 15<V2<24.5. When the above relation is satisfied, the chromatic aberration of the imaging lens system can be favorably corrected.

In the aforementioned imaging lens system, the central thickness of the first lens element is CT1, the central thickness of the second lens element is CT2, the central thickness of the third lens element is CT3, and they preferably satisfy the following relation: 0.80 mm<CT1+CT2+CT3<1.85 mm. When the above relation is satisfied, the central thickness sum of the first lens element, the second lens element and the third lens element is more appropriate, thereby facilitating the assembly of the lens elements and the space allocation within the imaging lens system.

On the other hand, the present disclosure provides an imaging lens system comprising, in order from an object side to an image side: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof; wherein there are three lens elements with refractive power in the imaging lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an axial distance between the first lens element and the second lens element is T12, an axial distance between the second lens element and the third lens element is T23, and they satisfy the following relations: 0.35<CT1/CT2<1.00; 0.35<CT3/CT2<1.00; −3.0<(R1+R2)/(R1−R2)<0; and 0.5<T12/T23<1.55.

When the relations of 0.35<CT1/CT2<1.00 and 0.35<CT3/CT2<1.00 are satisfied, the central thickness ratio of the first lens element and the second lens element and the central thickness ratio of the second lens element and the third lens element are more appropriate for not only the efficient spatial arrangement of the lens assembly but also the simpler individual lens production while assuring suitable thickness of the second lens element, thereby assuring image quality and improving yield rate of the product; preferably, the following relation is satisfied: 0.50<CT1/CT2<0.94.

When the relation of −3.0<(R1+R2)/(R1−R2)<0 is satisfied, the spherical aberration of the system can be corrected favorably; preferably, the following relation is satisfied: −2.5<(R1+R2)/(R1−R2)<−0.5.

When the relation of 0.5<T12/T23<1.55 is satisfied, the space between lens elements of the lens system is proper, which is not only favorable for more efficiency in space arrangement of lens elements, for keeping the lens system compact.

In the aforementioned imaging lens system, the system further comprising a stop, an axial distance between the stop and the image-side surface of the third lens element is Sd, an axial distance between the object-side surface of the first lens element and the image-side surface of the third lens element is Td, and they preferably satisfy the following relation: 0.65<Sd/Td<0.90. When the above relation is satisfied, a good balance between telecentricity and wide field of view can be achieved.

In the aforementioned imaging lens system, a focal length of the second lens element is f2, the focal length of the third lens element is f3, and they preferably satisfy the following relation: 0<f2/f3<0.75. When the above relation is satisfied, the refractive power of the second lens element and the third lens element are more balanced for correcting the aberration and reducing the sensitivity.

In the aforementioned imaging lens system, a focal length of the imaging lens system is f, the focal length of the second lens element is f2, and they preferably satisfy the following relation: −0.70<f/f2<−0.25. When the above relation is satisfied, the refractive power of the second lens element is more appropriate. This feature allows aberrations produced by the first lens element to be corrected favorably while preventing the refractive power of the second lens element from becoming too large, so that the sensitivity of the system can be favorably reduced.

In the aforementioned imaging lens system, a curvature radius of the image-side surface of the third lens element is R6, the focal length of the imaging lens system is f, and they preferably satisfy the following relation: 0.1<R6/f<0.6. When the above relation is satisfied, suitable refractive power can be obtained by the configuration of the curvature radius of the image-side surface of the third lens element, and thereby the aberration of the system can be favorably corrected.

In the aforementioned imaging lens system, the central thickness of the first lens element is CT1, the central thickness of the second lens element is CT2, the central thickness of the third lens element is CT3, and they preferably satisfy the following relation: 0.80 mm<CT1+CT2+CT3<1.85 mm. When the above relation is satisfied, the central thickness sum of the first lens element, the second lens element and the third lens element is more appropriate, thereby facilitating the assembly of the lens elements and the space allocation within the imaging lens system.

Furthermore, the present disclosure provides an imaging lens system comprising, in order from an object side to an image side: a first lens element with positive refractive power; a plastic second lens element with negative refractive power having a concave object-side surface and a convex image-side surface, both surfaces thereof being aspheric; and a plastic third lens element with negative refractive power having a convex object-side surface and a concave image-side surface, both surfaces thereof being aspheric, and at least one inflection point is formed on at least one of the object-side and image-side surfaces thereof; wherein there are three lens elements with refractive power in the imaging lens system, which are the first lens element, the second lens element and the third lens element; and the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an Abbe number of the second lens element is V2, and they satisfy the following relations: $0.35<CT1/CT2<1.00$; $0.35<CT3/CT2<1.00$; $-3.0<(R1+R2)/(R1-R2)<0$; and $15<V2<24.5$.

When the relations of $0.35<CT1/CT2<1.00$ and $0.35<CT3/CT2<1.00$ are satisfied, the central thickness ratio of the first lens element and the second lens element and the central thickness ratio of the second lens element and the third lens element are more appropriate for not only the efficient spatial arrangement of the lens assembly but also the simpler individual lens production while assuring suitable thickness of the second lens element, thereby assuring image quality and improving yield rate of the product; preferably, the following relation is satisfied: $0.50<CT1/CT2<0.94$.

In the aforementioned imaging lens system, the central thickness of the first lens element is CT1, the central thickness of the second lens element is CT2, the central thickness of the third lens element is CT3, and they preferably satisfy the following relation: 0.80 mm<CT1+CT2+CT3<1.85 mm. When the above relation is satisfied, the central thickness sum of the first lens element, the second lens element and the third lens element is more appropriate, thereby facilitating the assembly of the lens elements and the space allocation within the imaging lens system.

In the aforementioned imaging lens system, an axial distance between the first lens element and the second lens element is T12, an axial distance between the second lens element and the third lens element is T23, and they preferably satisfy the following relation: $0.5<T12/T23<1.55$. When the above relation is satisfied, the space between lens elements of the lens system is proper, which is not only favorable for more efficiency in space arrangement of lens elements, for keeping the lens system compact.

In the aforementioned imaging lens system, the lens elements can be made of glass or plastic material. If the lens elements are made of glass, the freedom for distributing the refractive power of the imaging lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the imaging lens system can be effectively reduced.

In the present imaging lens system, if a lens element has a convex surface, it means the portion of the surface in proximity to the optical axis is convex; if a lens element has a concave surface, it means the portion of the surface in proximity to the optical axis is concave.

In the present imaging lens system, there can be at least one stop, such as an aperture stop, a glare stop, or a field stop. Said glare stop or said field stop can be provided for eliminating stray light and thereby improving image resolution thereof. In addition, in the present imaging lens system, an aperture stop can be configured as a front stop (in front of the first lens element), a middle stop (between the first lens element and an image plane) or in front of the image plane. The allocation of the stop is determined by the preference of the optical designer.

Preferred embodiments of the present disclosure will be described in the following paragraphs by referring to the accompanying drawings.

Embodiment 1

Figure 1B:
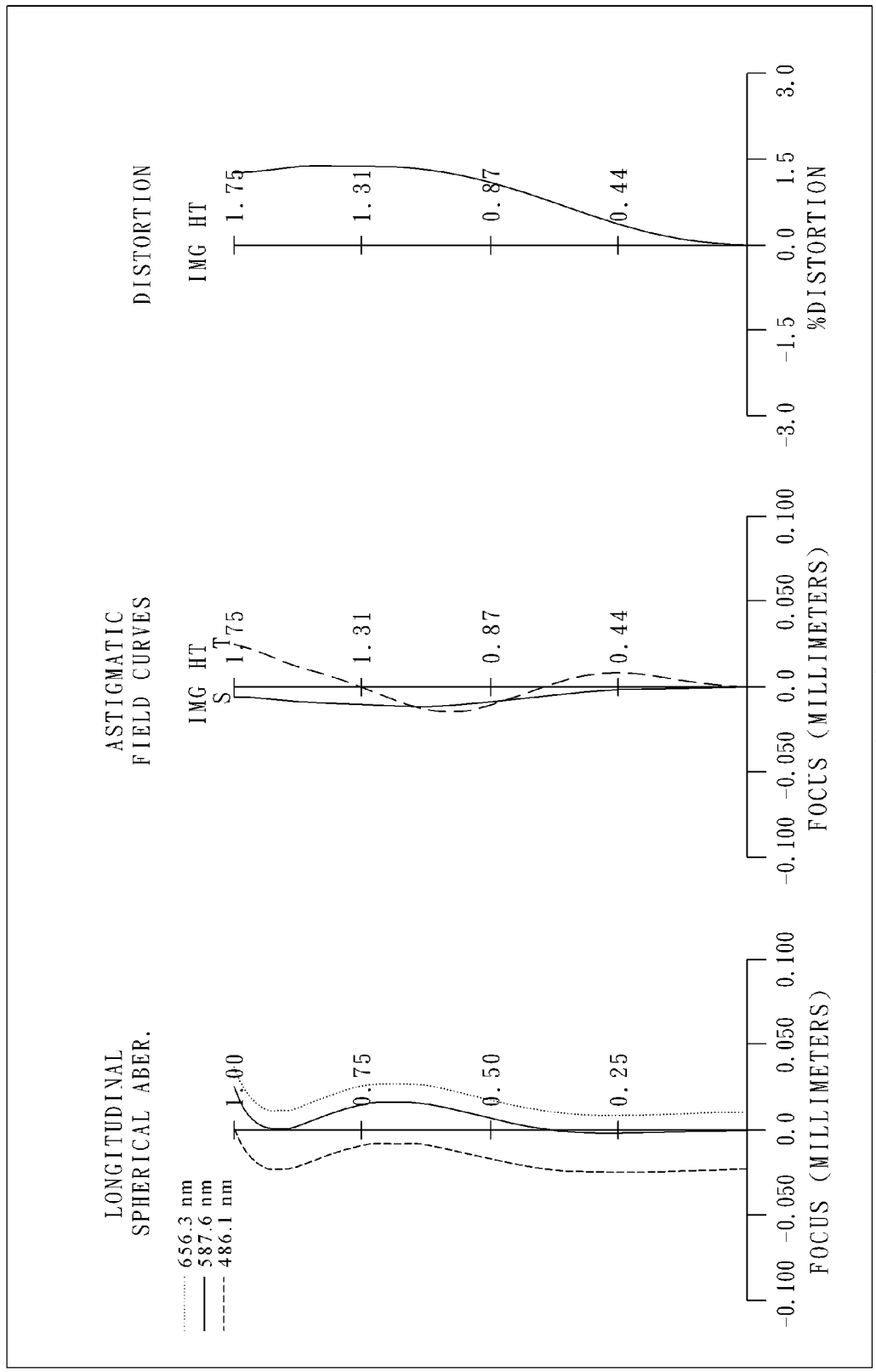
FIG. 1B shows the aberration curves of the first embodiment of the present disclosure.

FIG. 1A shows an imaging lens system in accordance with the first embodiment of the present disclosure, and FIG. 1B shows the aberration curves of the first embodiment of the present disclosure. The imaging lens system of the first embodiment of the present disclosure comprises three lens elements, in order from an object side to an image side:

a first lens element 110 made of plastic with positive refractive power having a convex object-side surface 111 and a concave image-side surface 112, the object-side and image-side surfaces 111 and 112 thereof being aspheric;

a second lens element 120 made of plastic with negative refractive power having a concave object-side surface 121 and a convex image-side surface 122, the object-side and image-side surfaces 121 and 122 thereof being aspheric; and a third lens element 130 made of plastic with negative refractive power having a convex object-side surface 131 and a concave image-side surface 132, the object-side and image-side surfaces 131 and 132 thereof being aspheric, and at least one inflection point is formed on the object-side surface 131 and the image-side surface 132 thereof;

wherein there are three lens elements with refractive power in the imaging lens system, which are the first lens element 110, the second lens element 120 and the third lens element 130 respectively; and the second lens element 120 has the greatest central thickness among the three lens elements 110, 120 and 130;

wherein an aperture stop 100 is disposed between the first lens element 110 and the second lens element 120;

the imaging lens system further comprises an IR filter 140 disposed between the image-side surface 132 of the third lens element 130 and an image plane 150, and the IR filter 140 is made of glass and has no influence on the focal length of the imaging lens system.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 2.85 mm, Fno = 2.50, HFOV = 31.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.090 | (ASP) | 0.427 | Plastic | 1.544 | 55.9 | 2.26 |
| 2 | | 8.361 | (ASP) | 0.042 | | | | |
| 3 | Ape. Stop | Plano | | 0.413 | | | | |
| 4 | Lens 2 | −1.143 | (ASP) | 0.566 | Plastic | 1.634 | 23.8 | −10.75 |
| 5 | | −1.638 | (ASP) | 0.431 | | | | |
| 6 | Lens 3 | 1.330 | (ASP) | 0.464 | Plastic | 1.544 | 55.9 | −23.6 |
| 7 | | 1.057 | (ASP) | 0.500 | | | | |
| 8 | IR-filter | Plano | | 0.300 | Glass | 1.517 | 64.2 | — |
| 9 | | Plano | | 0.267 | | | | |
| 10 | Image | Plano | | — | | | | |

* Reference wavelength is d-line 587.6 nm

TABLE 2

| | Aspheric Coefficients | | | | | |
|---|---|---|---|---|---|---|
| Surface # | 1 | 2 | 4 | 5 | 6 | 7 |
| k = | −8.0031E−02 | 0.0000E+00 | 7.2447E−01 | −3.6823E+00 | −7.8188E+00 | −5.1165E+00 |
| A4 = | 1.0641E−02 | −8.3465E−02 | −9.7511E−02 | −2.6228E−01 | −3.1187E−01 | −2.2174E−01 |
| A6 = | −1.5747E−01 | 6.9562E−02 | 1.2697E−01 | 5.9457E−01 | 2.1103E−01 | 1.2520E−01 |
| A8 = | 3.7791E−01 | −1.1884E+00 | 1.8885E+00 | −2.0606E−01 | −5.9100E−02 | −5.5857E−02 |
| A10 = | −6.4855E−01 | −6.2387E−01 | −5.7166E+00 | 1.9165E−01 | 2.7403E−04 | 1.1596E−02 |
| A12 = | −1.4141E+00 | 3.3805E+00 | −2.1631E+00 | −2.9121E−01 | −2.1912E−03 | −2.7258E−04 |
| A14 = | | | 7.2831E+00 | 2.3209E−01 | 1.7612E−03 | −3.9578E−04 |

The equation of the aspheric surface profiles is expressed as follows:

$$X(Y) = (Y^2/R)/(1 + \text{sqrt}(1-(1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the aspheric surface to the optical axis;

R: curvature radius;

k: the conic coefficient;

Ai: the aspheric coefficient of order i.

In the first embodiment of the present imaging lens system, the focal length of the imaging lens system is f, and it satisfies the following relation: f=2.85 (mm).

In the first embodiment of the present imaging lens system, the f-number of the imaging lens system is Fno, and it satisfies the relation: Fno=2.50.

In the first embodiment of the present imaging lens system, half of the maximal field of view of the imaging lens system is HFOV, and it satisfies the relation: HFOV=31.2 (degree).

In the first embodiment of the present imaging lens system, an Abbe number of the second lens element 120 is V2, and it satisfies the relation: V2=23.8.

In the first embodiment of the present imaging lens system, a central thickness of the first lens element 110 is CT1, a central thickness of the second lens element 120 is CT2, and they satisfy the relation: CT1/CT2=0.75.

In the first embodiment of the present imaging lens system, a central thickness of the third lens element 130 is CT3, the central thickness of the second lens element 120 is CT2, and they satisfy the relation: CT3/CT2=0.82.

In the first embodiment of the present imaging lens system, the central thickness of the first lens element 110 is CT1, the central thickness of the second lens element 120 is CT2, the central thickness of the third lens element 130 is CT3, and they satisfy the relation: CT1+CT2+CT3=1.46 (mm).

In the first embodiment of the present imaging lens system, an axial distance between the first lens element 110 and the second lens element 120 is T12, an axial distance between the second lens element 120 and the third lens element 130 is T23, and they satisfy the relation: T12/T23=1.06.

In the first embodiment of the present imaging lens system, the axial distance between the second lens element 120 and the third lens element 130 is T23, the central thickness of the third lens element 130 is CT3, and they satisfy the relation: T23/CT3=0.93.

In the first embodiment of the present imaging lens system, a curvature radius of the object-side surface 111 of the first lens element 110 is R1, a curvature radius of the image-side surface 112 of the first lens element 110 is R2, and they satisfy the relation: (R1+R2)/(R1−R2)=−1.30.

In the first embodiment of the present imaging lens system, a curvature radius of the image-side surface 132 of the third lens element 130 is R6, the focal length of the imaging lens system is f, and they satisfy the relation: R6/f=0.37.

In the first embodiment of the present imaging lens system, the focal length of the imaging lens system is f, a focal length of the second lens 120 element is f2, and they satisfy the relation: f/f2=−0.27.

In the first embodiment of the present imaging lens system, the focal length of the imaging lens system is f, a focal length of the third lens 130 element is f3, and they satisfy the relation: f/f3=−0.12.

In the first embodiment of the present imaging lens system, the focal length of the second lens 120 element is f2, the focal length of the third lens 130 element is f3, and they satisfy the relation: f2/f3=0.45.

In the first embodiment of the present imaging lens system, an axial distance between the stop 100 and the image-side surface 132 of the third lens element 130 is Sd, an axial distance between the object-side surface 111 of the first lens element 110 and the image-side surface 132 of the third lens element 130 is Td, and they satisfy the relation: Sd/Td=0.80.

Embodiment 2

Figure 2A:
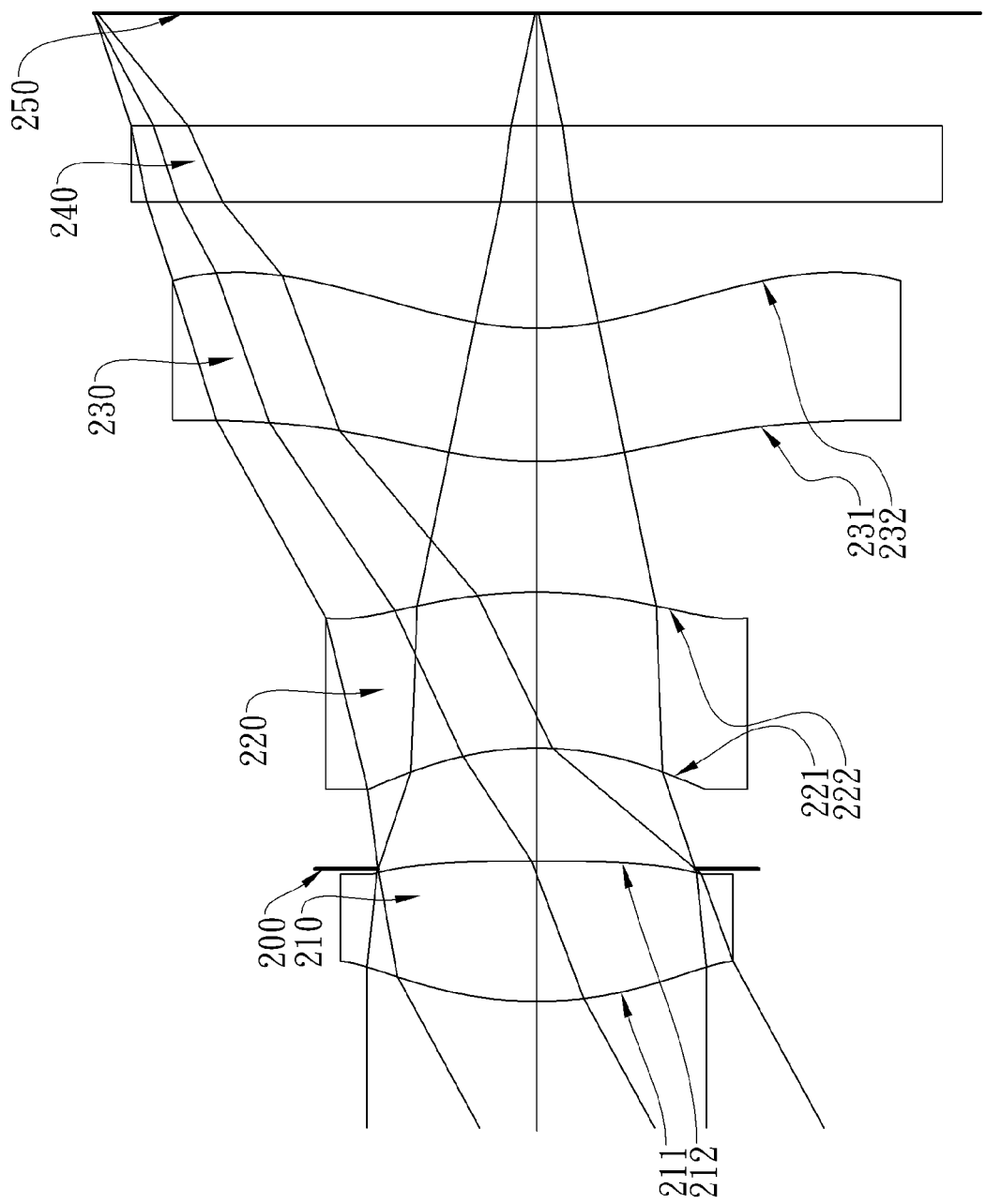
FIG. 2A shows an imaging lens system in accordance with a second embodiment of the present disclosure.
Figure 2B:
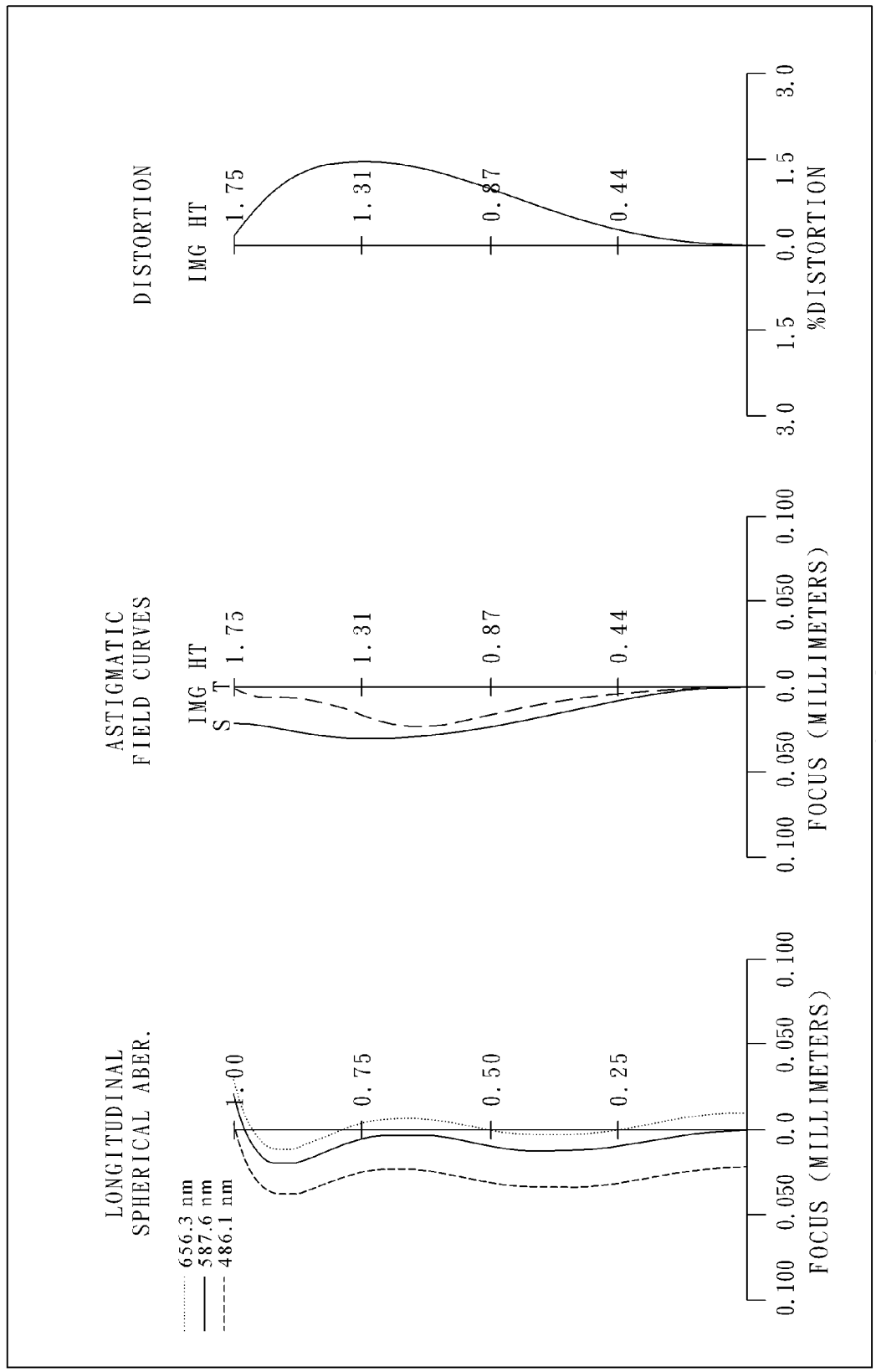
FIG. 2B shows the aberration curves of the second embodiment of the present disclosure.

FIG. 2A shows an imaging lens system in accordance with the second embodiment of the present disclosure, and FIG. 2B shows the aberration curves of the second embodiment of the present disclosure. The imaging lens system of the second embodiment of the present disclosure comprises three lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with negative refractive power having a concave object-side surface 221 and a convex image-side surface 222, the object-side and image-side surfaces 221 and 222 thereof being aspheric; and a third lens element 230 made of plastic with negative refractive power having a convex object-side surface 231 and a concave image-side surface 232, the object-side and image-side surfaces 231 and 232 thereof being aspheric, and at least one inflection point is formed on the object-side surface 231 and the image-side surface 232 thereof;

wherein there are three lens elements with refractive power in the imaging lens system, which are the first lens element 210, the second lens element 220 and the third lens element 230 respectively; and the second lens element 220 has the greatest central thickness among the three lens elements 210, 220 and 230;

wherein an aperture stop 200 is disposed between the first lens element 210 and the second lens element 220;

the imaging lens system further comprises an IR filter 240 disposed between the image-side surface 232 of the third lens element 230 and an image plane 250, and the IR filter 240 is made of glass and has no influence on the focal length of the imaging lens system.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 3.22 mm, Fno = 2.40, HFOV = 28.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.501 | (ASP) | 0.555 | Plastic | 1.544 | 55.9 | 2.47 |
| 2 | | −10.979 | (ASP) | −0.031 | | | | |
| 3 | Ape. Stop | Plano | | 0.478 | | | | |
| 4 | Lens 2 | −1.299 | (ASP) | 0.616 | Plastic | 1.640 | 23.3 | −8.54 |
| 5 | | −2.020 | (ASP) | 0.517 | | | | |
| 6 | Lens 3 | 1.456 | (ASP) | 0.527 | Plastic | 1.535 | 56.3 | −70.71 |
| 7 | | 1.225 | (ASP) | 0.500 | | | | |
| 8 | IR-filter | Plano | | 0.300 | Glass | 1.517 | 64.2 | — |
| 9 | | Plano | | 0.446 | | | | |
| 10 | Image | Plano | | — | | | | |

* Reference wavelength is d-line 587.6 nm

TABLE 4

| | Aspheric Coefficients | | | | | |
|---|---|---|---|---|---|---|
| Surface # | 1 | 2 | 4 | 5 | 6 | 7 |
| k = | −1.8825E−01 | −6.9293E+00 | −2.9444E−01 | −1.1502E+01 | −4.1874E+00 | −3.6626E+00 |
| A4 = | −3.4158E−02 | −1.4540E−01 | 2.0076E−03 | −2.0331E−01 | −2.0499E−01 | −1.4311E−01 |
| A6 = | −1.5469E−01 | 4.6512E−02 | −1.4032E−05 | 4.9560E−01 | 1.3488E−01 | 6.0169E−02 |
| A8 = | 2.3163E−01 | −5.4690E−01 | 1.1989E+00 | −2.8929E−01 | −6.0105E−02 | −1.5442E−02 |
| A10 = | −4.8206E−01 | 5.2039E−01 | −2.9166E+00 | 1.2067E−01 | 1.3269E−02 | −2.7435E−03 |
| A12 = | | | 2.7713E+00 | 1.3781E−01 | 1.4625E−03 | 2.0170E−03 |
| A14 = | | | −5.3313E−01 | −1.1198E−01 | −7.7268E−04 | −2.3704E−04 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

| Embodiment 2 | | | |
|---|---|---|---|
| f [mm] | 3.22 | T23/CT3 | 0.98 |
| Fno | 2.40 | (R1 + R2)/(R1 − R2) | −0.76 |
| HFOV [deg.] | 28.6 | R6/f | 0.38 |
| V2 | 23.3 | f/f2 | −0.38 |
| CT1/CT2 | 0.90 | f/f3 | −0.05 |
| CT3/CT2 | 0.86 | f2/f3 | 0.12 |
| CT1 + CT2 + CT3 [mm] | 1.70 | SD/TD | 0.80 |
| T12/T23 | 0.86 | | |

Embodiment 3

Figure 3A:
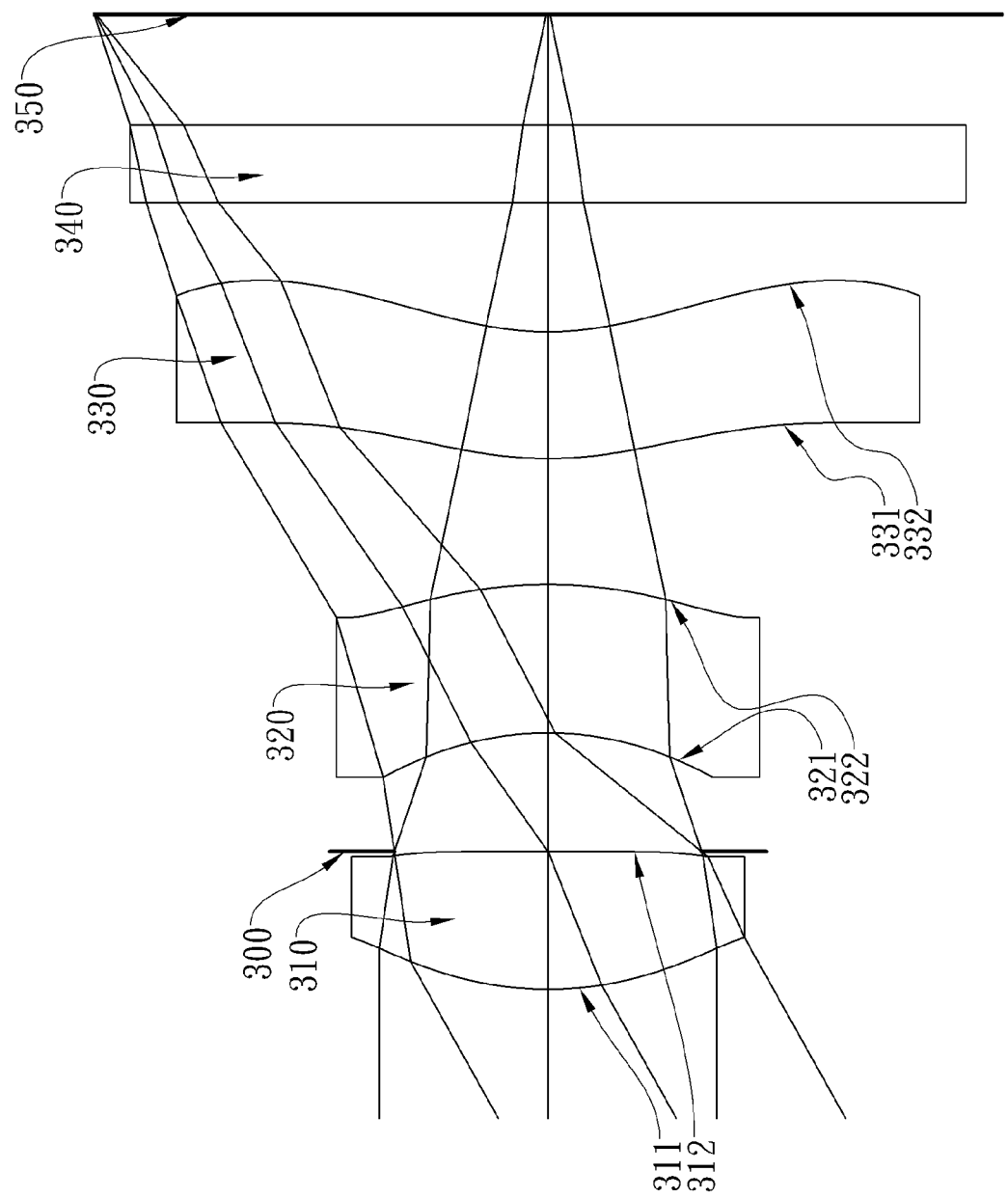
FIG. 3A shows an imaging lens system in accordance with a third embodiment of the present disclosure.
Figure 3B:
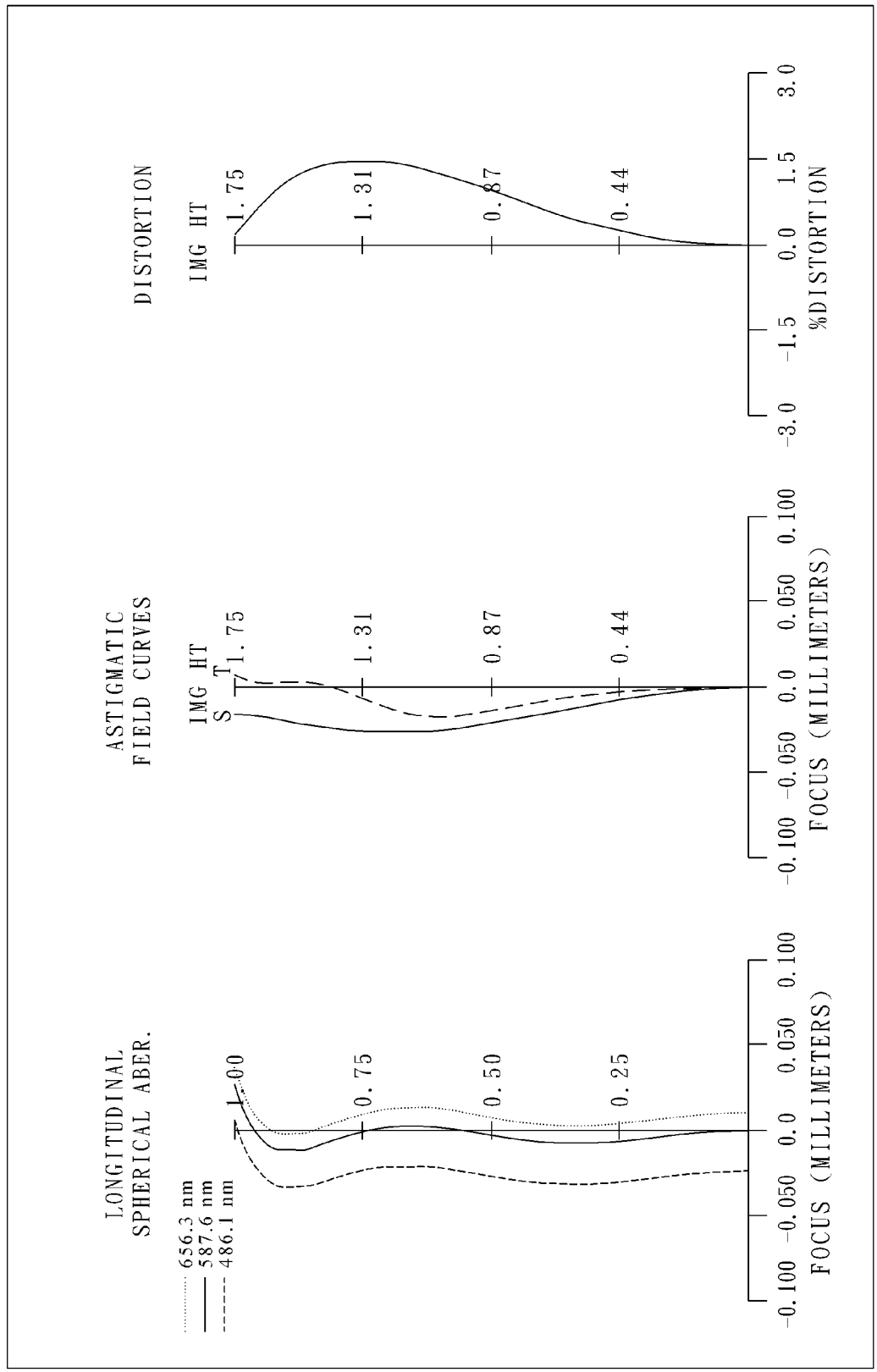
FIG. 3B shows the aberration curves of the third embodiment of the present disclosure.

FIG. 3A shows an imaging lens system in accordance with the third embodiment of the present disclosure, and FIG. 3B shows the aberration curves of the third embodiment of the present disclosure. The imaging lens system of the third embodiment of the present disclosure comprises three lens elements, in order from an object side to an image side:

a first lens element 310 made of plastic with positive refractive power having a convex object-side surface 311 and a concave image-side surface 312, the object-side and image-side surfaces 311 and 312 thereof being aspheric;

a second lens element 320 made of plastic with negative refractive power having a concave object-side surface 321 and a convex image-side surface 322, the object-side and image-side surfaces 321 and 322 thereof being aspheric; and a third lens element 330 made of plastic with negative refractive power having a convex object-side surface 331 and a concave image-side surface 332, the object-side and image-side surfaces 331 and 332 thereof being aspheric, and at least one inflection point is formed on the object-side surface 331 and the image-side surface 332 thereof;

wherein there are three lens elements with refractive power in the imaging lens system, which are the first lens element 310, the second lens element 320 and the third lens element 330 respectively; and the second lens element 320 has the greatest central thickness among the three lens elements 310, 320 and 330;

wherein an aperture stop 300 is disposed between the first lens element 310 and the second lens element 320;

the imaging lens system further comprises an IR filter 340 disposed between the image-side surface 332 of the third lens element 330 and an image plane 350, and the IR filter 340 is made of glass and has no influence on the focal length of the imaging lens system.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)
f = 3.13 mm, Fno = 2.40, HFOV = 29.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.319 | (ASP) | 0.532 | Plastic | 1.544 | 55.9 | 2.49 |
| 2 | | 40.000 | (ASP) | 0.000 | | | | |
| 3 | Ape. Stop | Plano | | 0.459 | | | | |
| 4 | Lens 2 | −1.249 | (ASP) | 0.574 | Plastic | 1.640 | 23.3 | −9.91 |
| 5 | | −1.835 | (ASP) | 0.487 | | | | |
| 6 | Lens 3 | 1.388 | (ASP) | 0.491 | Plastic | 1.535 | 56.3 | −88.31 |
| 7 | | 1.182 | (ASP) | 0.500 | | | | |
| 8 | IR-filter | Plano | | 0.300 | Glass | 1.517 | 64.2 | — |
| 9 | | Plano | | 0.427 | | | | |
| 10 | Image | Plano | | — | | | | |

\* Reference wavelength is d-line 587.6 nm

TABLE 7

| | Aspheric Coefficients | | | | | |
|---|---|---|---|---|---|---|
| Surface # | 1 | 2 | 4 | 5 | 6 | 7 |
| k = | −2.1909E−01 | 5.0000E+01 | 1.3265E−01 | −6.4148E+00 | −5.7788E+00 | −4.5007E+00 |
| A4 = | −9.5164E−03 | −1.2096E−01 | −4.9637E−02 | −2.1854E−01 | −2.0436E−01 | −1.4367E−01 |
| A6 = | −1.4330E−01 | 5.9601E−02 | 1.3914E−01 | 5.1289E−01 | 1.3463E−01 | 5.8812E−02 |
| A8 = | 3.1678E−01 | −7.6228E−01 | 7.0350E−01 | −3.0467E−01 | −5.9634E−02 | −1.5766E−02 |
| A10 = | −6.2634E−01 | 7.3072E−01 | −2.0442E+00 | 1.2823E−01 | 1.3326E−02 | −2.5177E−03 |
| A12 = | | | 2.0196E+00 | 2.4972E−01 | 1.4838E−03 | 1.8430E−03 |
| A14 = | | | −5.3313E−01 | −2.0392E−01 | −7.9376E−04 | −1.8629E−04 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

Embodiment 3

| f [mm] | 3.13 | T23/CT3 | 0.99 |
|---|---|---|---|
| Fno | 2.40 | (R1 + R2)/(R1 − R2) | −1.07 |
| HFOV [deg.] | 29.2 | R6/f | 0.38 |
| V2 | 23.3 | f/f2 | −0.32 |
| CT1/CT2 | 0.93 | f/f3 | −0.04 |
| CT3/CT2 | 0.86 | f2/f3 | 0.11 |
| CT1 + CT2 + CT3 [mm] | 1.60 | SD/TD | 0.79 |
| T12/T23 | 0.94 | | |

Embodiment 4

Figure 4A:
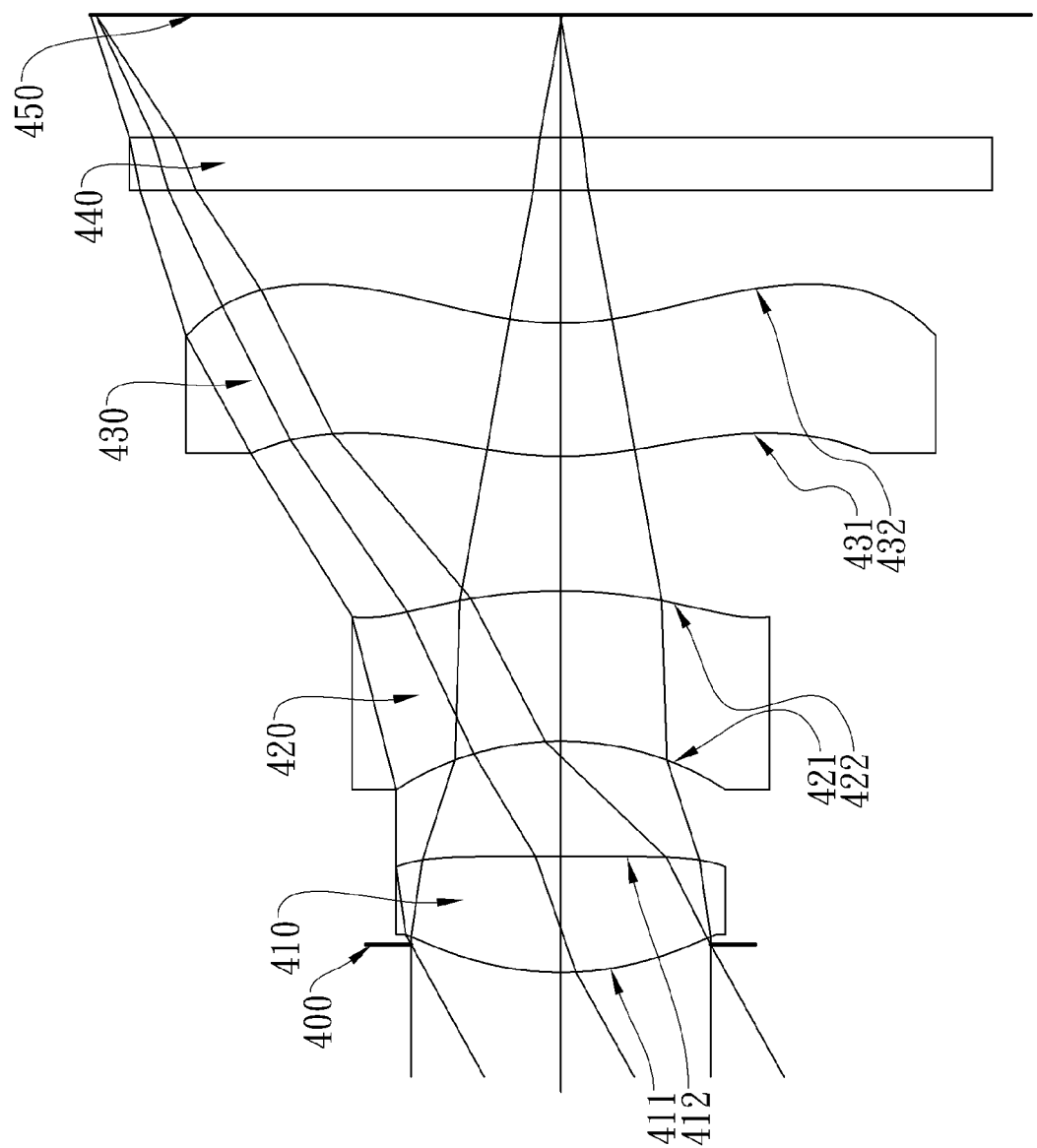
FIG. 4A shows an imaging lens system in accordance with a fourth embodiment of the present disclosure.
Figure 4B:
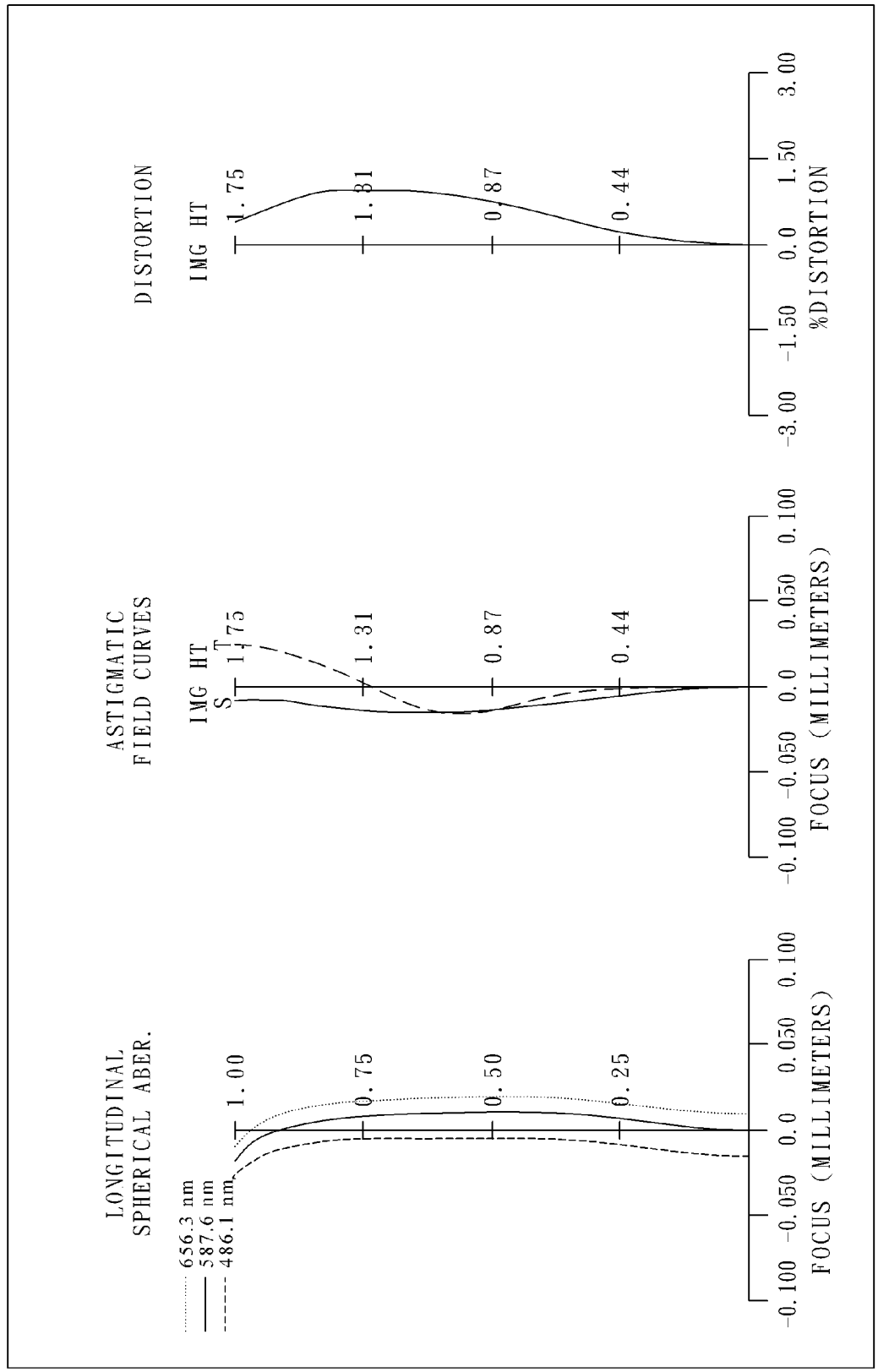
FIG. 4B shows the aberration curves of the fourth embodiment of the present disclosure.

FIG. 4A shows an imaging lens system in accordance with the fourth embodiment of the present disclosure, and FIG. 4B shows the aberration curves of the fourth embodiment of the present disclosure. The imaging lens system of the fourth embodiment of the present disclosure comprises three lens elements, in order from an object side to an image side:

a first lens element 410 made of plastic with positive refractive power having a convex object-side surface 411 and a concave image-side surface 412, the object-side and image-side surfaces 411 and 412 thereof being aspheric;

a second lens element 420 made of plastic with negative refractive power having a concave object-side surface 421 and a convex image-side surface 422, the object-side and image-side surfaces 421 and 422 thereof being aspheric; and a third lens element 430 made of plastic with negative refractive power having a convex object-side surface 431 and a concave image-side surface 432, the object-side and image-side surfaces 431 and 432 thereof being aspheric, and at least one inflection point is formed on the object-side surface 431 and the image-side surface 432 thereof;

wherein there are three lens elements with refractive power in the imaging lens system, which are the first lens element 410, the second lens element 420 and the third lens element 430 respectively; and the second lens element 420 has the greatest central thickness among the three lens elements 410, 420 and 430;

wherein an aperture stop 400 is disposed between an imaged object and the first lens element 410;

the imaging lens system further comprises an IR filter 440 disposed between the image-side surface 432 of the third lens element 430 and an image plane 450, and the IR filter 440 is made of glass and has no influence on the focal length of the imaging lens system.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 4)
f = 3.16 mm, Fno = 2.80, HFOV = 28.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.105 | | | | |
| 2 | Lens 1 | 1.170 | (ASP) | 0.435 | Plastic | 1.544 | 55.9 | 2.22 |
| 3 | | 30.769 | (ASP) | 0.435 | | | | |
| 4 | Lens 2 | −1.186 | (ASP) | 0.566 | Plastic | 1.650 | 21.4 | −5.76 |
| 5 | | −2.063 | (ASP) | 0.508 | | | | |
| 6 | Lens 3 | 1.378 | (ASP) | 0.501 | Plastic | 1.530 | 55.8 | −48.23 |
| 7 | | 1.143 | (ASP) | 0.500 | | | | |
| 8 | IR-filter | Plano | | 0.200 | Glass | 1.517 | 64.2 | — |
| 9 | | Plano | | 0.461 | | | | |
| 10 | Image | Plano | | — | | | | |

\* Reference wavelength is d-line 587.6 nm

TABLE 10

| Aspheric Coefficients | | | | | | |
|---|---|---|---|---|---|---|
| Surface # | 2 | 3 | 4 | 5 | 6 | 7 |
| k = | −1.8517E+00 | −1.0000E+00 | −1.5418E+00 | 7.7351E−01 | −3.8058E+00 | −4.2581E+00 |
| A4 = | 9.6082E−02 | −1.1647E−01 | −1.9539E−01 | −8.9776E−02 | −3.9833E−01 | −2.5586E−01 |
| A6 = | 6.2655E−02 | −4.0598E−01 | −5.9598E−02 | 4.2295E−01 | 2.8295E−01 | 1.5345E−01 |
| A8 = | −1.1310E+00 | 8.5929E−01 | 2.2186E+00 | 1.9645E−01 | −1.0447E−01 | −6.9775E−02 |
| A10 = | 3.0852E+00 | −3.4641E+00 | −1.0184E+01 | −8.1994E−01 | −8.3496E−03 | 1.1522E−02 |
| A12 = | −5.5378E+00 | 2.1337E+00 | 1.6985E+01 | 9.2953E−01 | 1.0978E−02 | 9.7546E−04 |
| A14 = | | | −9.8944E+00 | −1.9445E−01 | 1.7882E−04 | −6.2546E−04 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

| Embodiment 4 | | | |
|---|---|---|---|
| f [mm] | 3.16 | T23/CT3 | 1.01 |
| Fno | 2.80 | (R1 + R2)/(R1 − R2) | −1.08 |
| HFOV [deg.] | 28.9 | R6/f | 0.36 |
| V2 | 21.4 | f/f2 | −0.55 |
| CT1/CT2 | 0.77 | f/f3 | −0.07 |
| CT3/CT2 | 0.89 | f2/f3 | 0.12 |
| CT1 + CT2 + CT3 [mm] | 1.50 | SD/TD | 0.96 |
| T12/T23 | 0.86 | | |

Embodiment 5

Figure 5A:
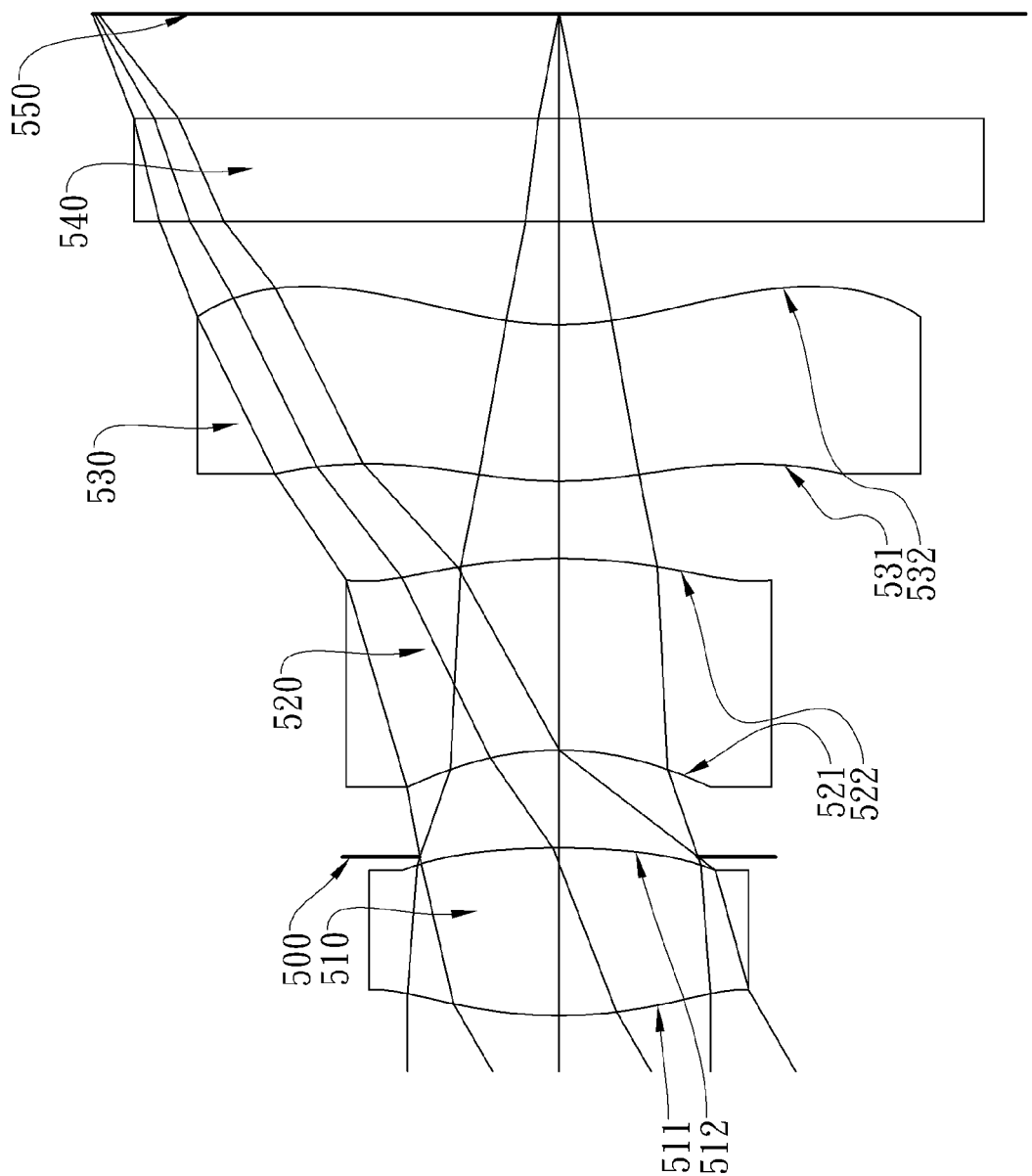
FIG. 5A shows an imaging lens system in accordance with a fifth embodiment of the present disclosure.
Figure 5B:
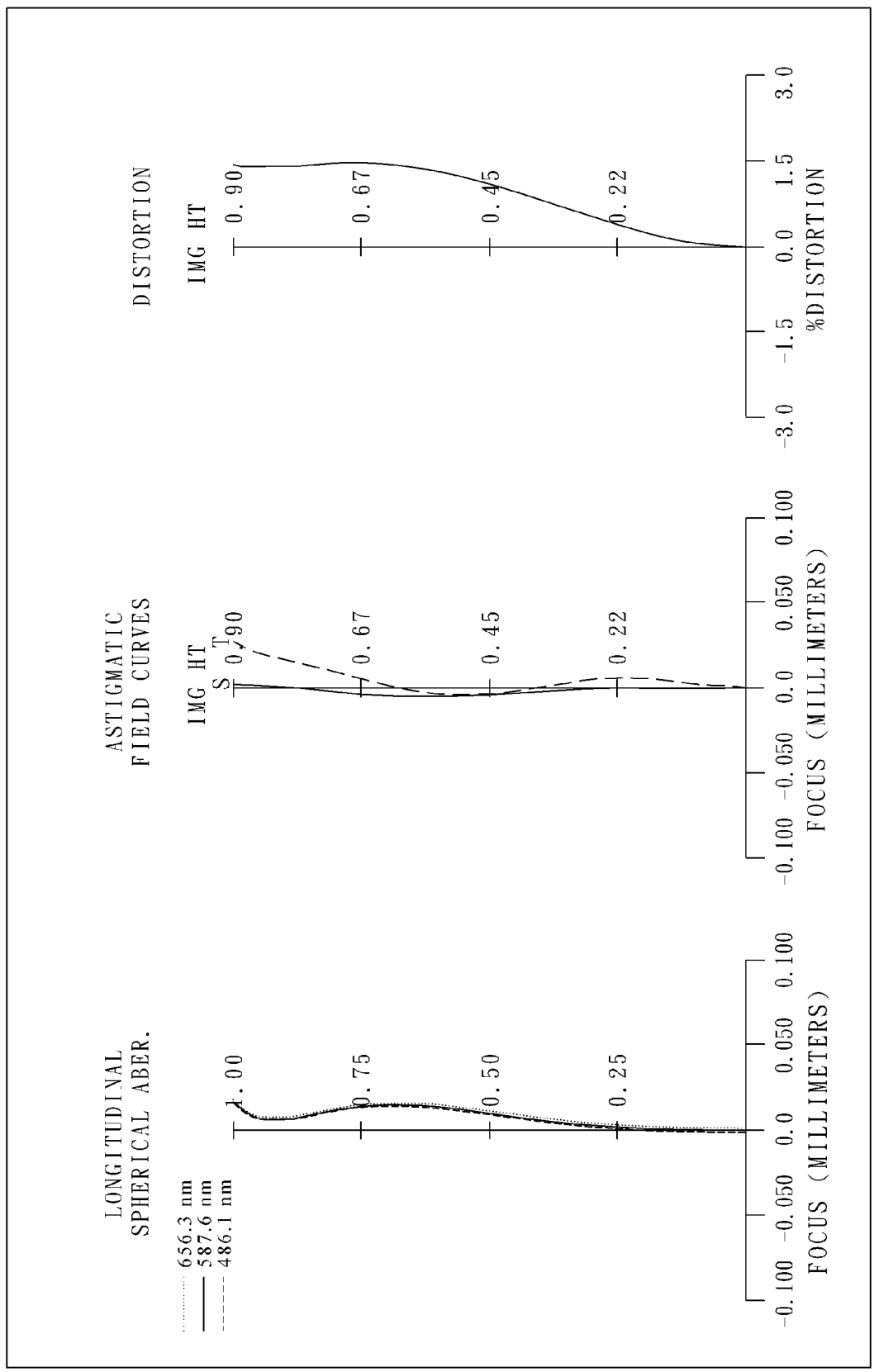
FIG. 5B shows the aberration curves of the fifth embodiment of the present disclosure.

FIG. 5A shows an imaging lens system in accordance with the fifth embodiment of the present disclosure, and FIG. 5B shows the aberration curves of the fifth embodiment of the present disclosure. The imaging lens system of the fifth embodiment of the present disclosure comprises three lens elements, in order from an object side to an image side:

a first lens element 510 made of glass with positive refractive power having a convex object-side surface 511 and a convex image-side surface 512, the object-side and image-side surfaces 511 and 512 thereof being aspheric;

a second lens element 520 made of plastic with negative refractive power having a concave object-side surface 521 and a convex image-side surface 522, the object-side and image-side surfaces 521 and 522 thereof being aspheric; and a third lens element 530 made of plastic with negative refractive power having a convex object-side surface 531 and a concave image-side surface 532, the object-side and image-side surfaces 531 and 532 thereof being aspheric, and at least one inflection point is formed on the object-side surface 531 and the image-side surface 532 thereof;

wherein there are three lens elements with refractive power in the imaging lens system, which are the first lens element 510, the second lens element 520 and the third lens element 530 respectively; and the second lens element 520 has the greatest central thickness among the three lens elements 510, 520 and 530;

wherein an aperture stop 500 is disposed between the first lens element 510 and the second lens element 520;

the imaging lens system further comprises an IR filter 540 disposed between the image-side surface 532 of the third lens element 530 and an image plane 550, and the IR filter 540 is made of glass and has no influence on the focal length of the imaging lens system.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)
f = 1.53 mm, Fno = 2.60, HFOV = 30.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens | 0.872 | (ASP) | 0.325 | Glass | 1.592 | 67.0 | 1.01 |
| 2 | 1 | −1.655 | (ASP) | −0.017 | | | | |
| 3 | Ape. Stop | Plano | | 0.207 | | | | |
| 4 | Lens | −0.586 | (ASP) | 0.372 | Plastic | 1.640 | 23.3 | −2.30 |
| 5 | 2 | −1.214 | (ASP) | 0.150 | | | | |
| 6 | Lens | 0.761 | (ASP) | 0.304 | Plastic | 1.530 | 55.8 | −26.64 |
| 7 | 3 | 0.622 | (ASP) | 0.200 | | | | |
| 8 | IR- | Plano | | 0.200 | Glass | 1.517 | 64.2 | — |
| 9 | filter | Plano | | 0.203 | | | | |
| 10 | Image | Plano | | — | | | | |

* Reference wavelength is d-line 587.6 nm

TABLE 13

| Aspheric Coefficients | | | | | | |
|---|---|---|---|---|---|---|
| Surface # | 1 | 2 | 4 | 5 | 6 | 7 |
| k = | −2.1125E+00 | −1.0000E+00 | −1.4270E+00 | 7.5067E−01 | −1.2447E+01 | −5.9798E+00 |
| A4 = | −3.3376E−01 | −1.3472E+00 | 2.3859E−01 | −1.0560E+00 | −1.9305E+00 | −1.2735E+00 |
| A6 = | −2.3705E+00 | −4.6384E+00 | −3.9682E+01 | 1.9096E+01 | 3.7774E+00 | 2.1602E+00 |
| A8 = | −1.3754E+01 | −2.4383E+01 | 1.2086E+03 | −5.9527E+01 | −2.2878E+00 | −3.6014E+00 |
| A10 = | −1.3439E+02 | 2.5725E+02 | −1.3376E+04 | 1.6568E+02 | 1.3636E+00 | 2.5473E+00 |
| A12 = | −3.0564E+02 | 6.5575E−03 | 5.0977E+04 | 4.2868E+01 | −1.8737E+01 | −9.0509E−02 |
| A14 = | | | 2.6045E−02 | −1.3980E+03 | 3.1181E+01 | −1.2436E+00 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

| Embodiment 5 | | | |
|---|---|---|---|
| f [mm] | 1.53 | T23/CT3 | 0.49 |
| Fno | 2.60 | (R1 + R2)/(R1 − R2) | −0.31 |
| HFOV [deg.] | 30.0 | R6/f | 0.41 |
| V2 | 23.3 | f/f2 | −0.66 |
| CT1/CT2 | 0.87 | f/f3 | −0.06 |
| CT3/CT2 | 0.82 | f2/f3 | 0.09 |
| CT1 + CT2 + CT3 [mm] | 1.00 | SD/TD | 0.77 |
| T12/T23 | 1.27 | | |

Embodiment 6

Figure 6A:
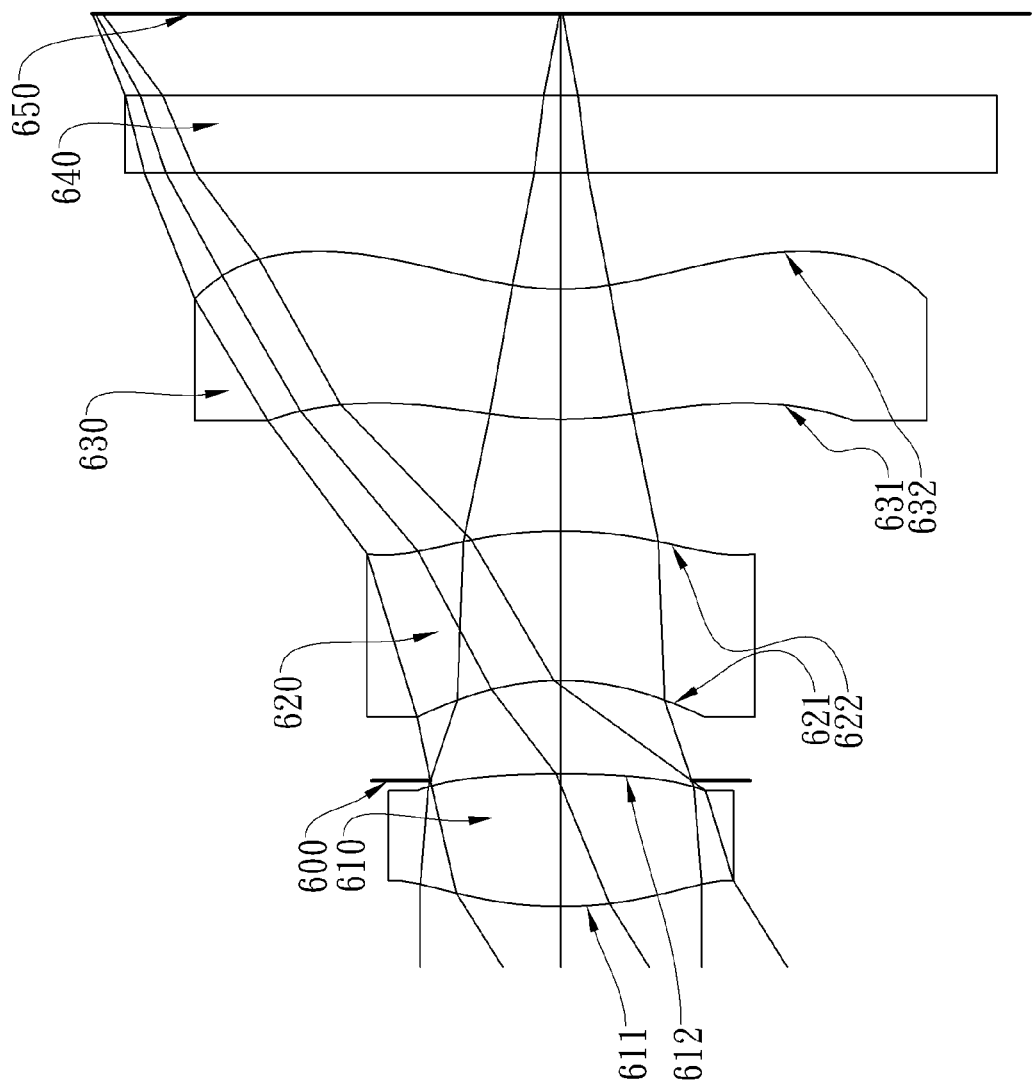
FIG. 6A shows an imaging lens system in accordance with a sixth embodiment of the present disclosure.
Figure 6B:
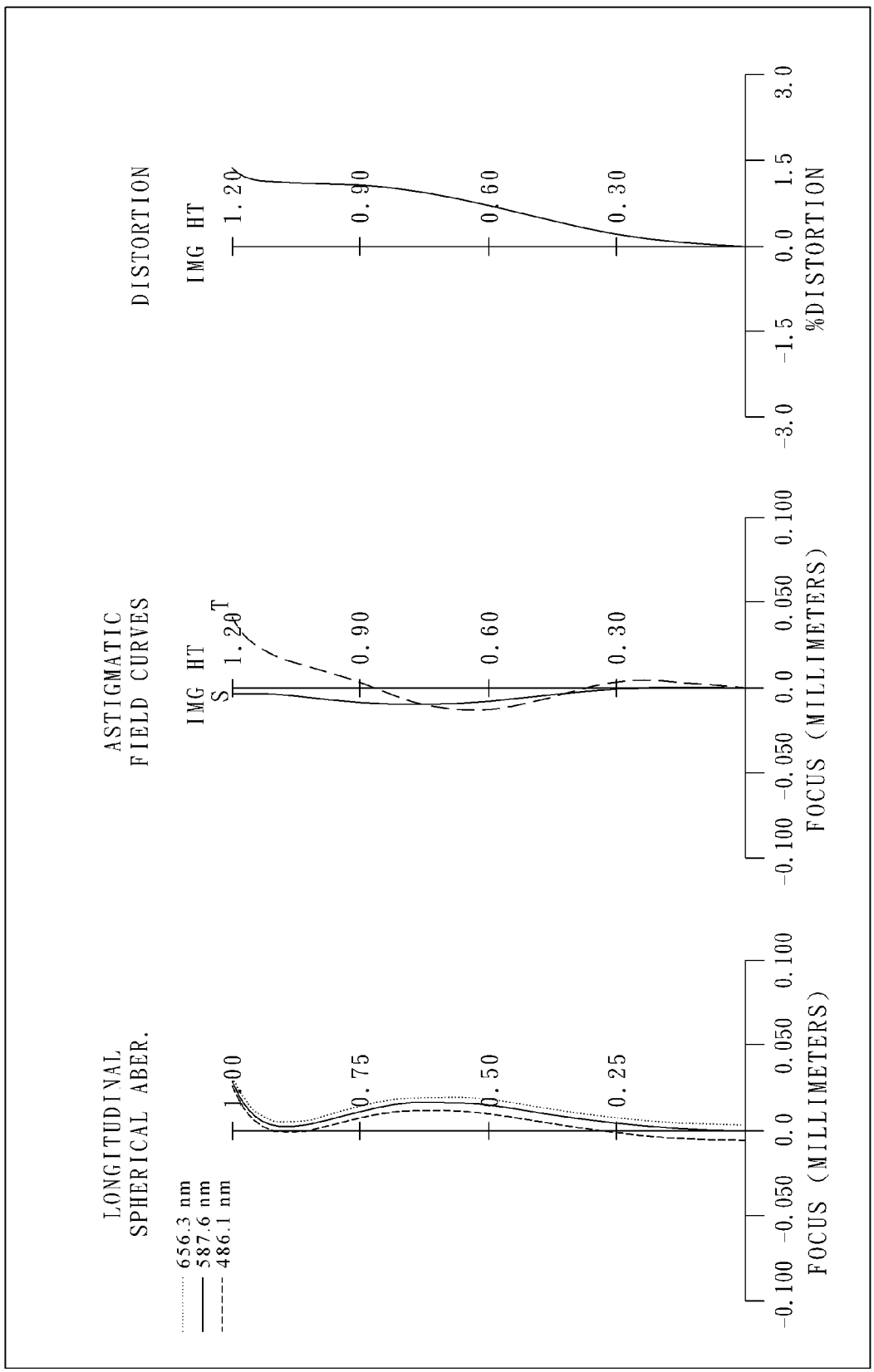
FIG. 6B shows the aberration curves of the sixth embodiment of the present disclosure.

FIG. 6A shows an imaging lens system in accordance with the sixth embodiment of the present disclosure, and FIG. 6B shows the aberration curves of the sixth embodiment of the present disclosure. The imaging lens system of the sixth embodiment of the present disclosure comprises three lens elements, in order from an object side to an image side:

a first lens element 610 made of glass with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a convex image-side surface 622, the object-side and image-side surfaces 621 and 622 thereof being aspheric; and a third lens element 630 made of plastic with negative refractive power having a convex object-side surface 631 and a concave image-side surface 632, the object-side and image-side surfaces 631 and 632 thereof being aspheric, and at least one inflection point is formed on the object-side surface 631 and the image-side surface 632 thereof;

wherein there are three lens elements with refractive power in the imaging lens system, which are the first lens element 610, the second lens element 620 and the third lens element 630 respectively; and the second lens element 620 has the greatest central thickness among the three lens elements 610, 620 and 630;

wherein an aperture stop 600 is disposed between the first lens element 610 and the second lens element 620;

the imaging lens system further comprises an IR filter 640 disposed between the image-side surface 632 of the third lens element 630 and an image plane 650, and the IR filter 640 is made of glass and has no influence on the focal length of the imaging lens system.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

| (Embodiment 6) f = 1.89 mm, Fno = 2.60, HFOV = 32.0 deg. | | | | | | |
|---|---|---|---|---|---|---|
| Surface # | | Curvature Radius | Thickness | Material | Index | Abbe # | Focal length |
| 0 | Object | Plano | Infinity | | | | |
| 1 | Lens | 0.992 (ASP) | 0.342 | Glass | 1.592 | 67.0 | 1.31 |
| 2 | 1 | −3.057 (ASP) | −0.017 | | | | |
| 3 | Ape. Stop | Plano | 0.258 | | | | |
| 4 | Lens | −0.708 (ASP) | 0.386 | Plastic | 1.640 | 23.3 | −4.41 |
| 5 | 2 | −1.145 (ASP) | 0.288 | | | | |
| 6 | Lens | 0.999 (ASP) | 0.336 | Plastic | 1.544 | 55.9 | −8.03 |
| 7 | 3 | 0.717 (ASP) | 0.300 | | | | |
| 8 | IR-filter | Plano | 0.200 | Glass | 1.517 | 64.2 | — |
| 9 | | Plano | 0.210 | | | | |
| 10 | Image | Plano | — | | | | |

* Reference wavelength is d-line 587.6 nm

TABLE 16

| Aspheric Coefficients | | | | | | |
|---|---|---|---|---|---|---|
| Surface # | 1 | 2 | 4 | 5 | 6 | 7 |
| k = | −1.9288E+00 | −1.0000E+00 | −8.7507E−01 | −1.6927E+00 | −1.4655E+01 | −7.0112E+00 |
| A4 = | −1.2968E−01 | −7.3966E−01 | −2.6410E−02 | −3.1760E−01 | −8.5897E−01 | −5.7935E−01 |
| A6 = | −1.2132E+00 | −2.1876E+00 | −3.3985E+00 | 5.6920E+00 | 1.0416E+00 | 5.8255E−01 |
| A8 = | −5.7863E−01 | −6.9411E+00 | 1.2063E+02 | −7.5732E+00 | −2.9820E−01 | −5.6258E−01 |
| A10 = | −4.3581E+01 | 4.3635E+01 | −8.9215E+02 | 1.0679E+01 | −3.0940E−01 | 2.5940E−01 |
| A12 = | −1.2927E+01 | 8.9300E−04 | 2.1530E+03 | −2.8703E+00 | −1.2072E+00 | −9.9029E−02 |
| A14 = | | | 2.1197E−03 | −3.3283E+01 | 1.5355E+00 | −5.1280E−03 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| Embodiment 6 | | | |
|---|---|---|---|
| f [mm] | 1.89 | T23/CT3 | 0.86 |
| Fno | 2.60 | (R1 + R2)/(R1 − R2) | −0.51 |
| HFOV [deg.] | 32.0 | R6/f | 0.38 |
| V2 | 23.3 | f/f2 | −0.43 |
| CT1/CT2 | 0.89 | f/f3 | −0.24 |

TABLE 17-continued

| Embodiment 6 | | | |
|---|---|---|---|
| CT3/CT2 | 0.87 | f2/f3 | 0.55 |
| CT1 + CT2 + CT3 [mm] | 1.06 | SD/TD | 0.80 |
| T12/T23 | 0.84 | | |

Embodiment 7

Figure 7A:
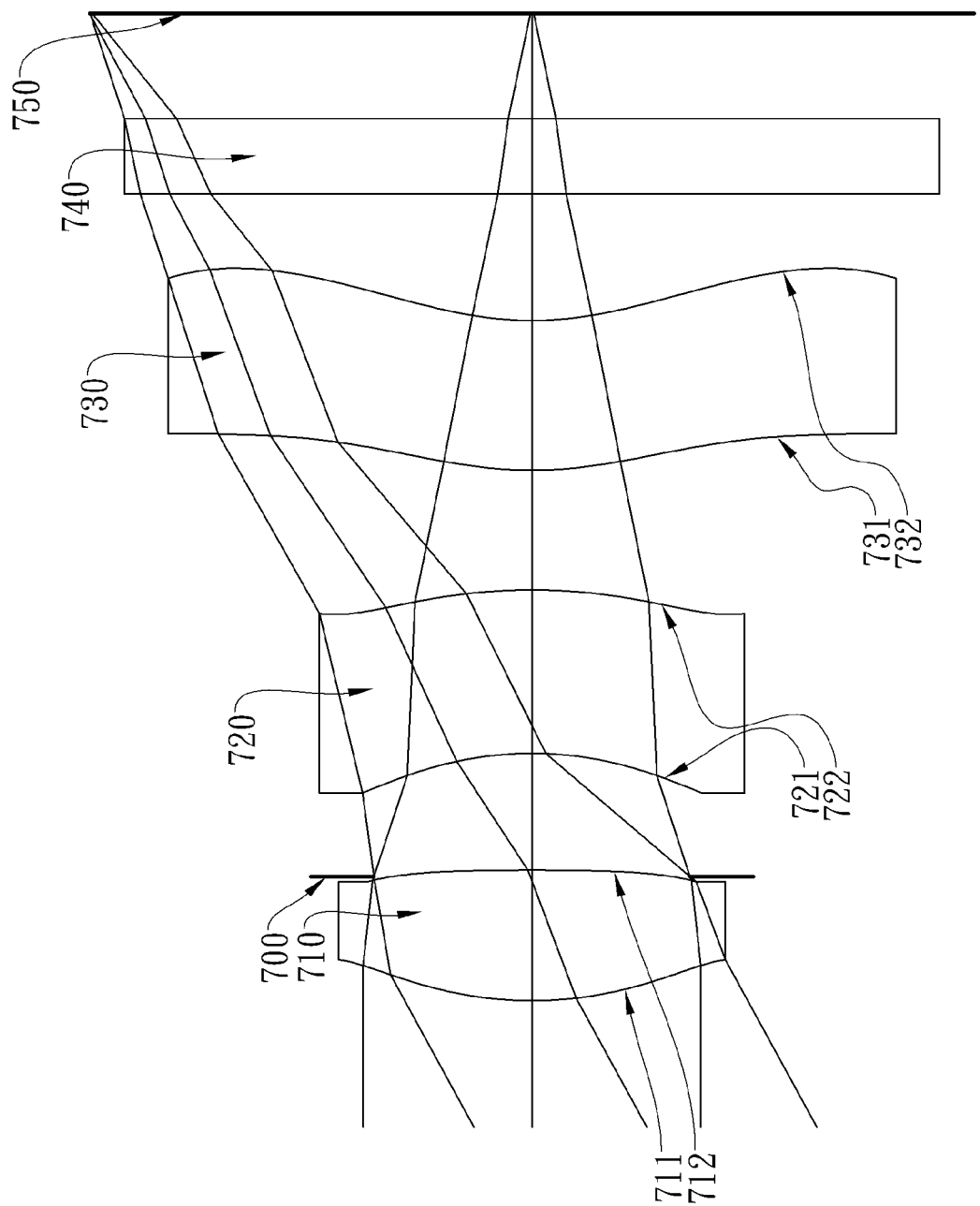
FIG. 7A shows an imaging lens system in accordance with a seventh embodiment of the present disclosure.
Figure 7B:
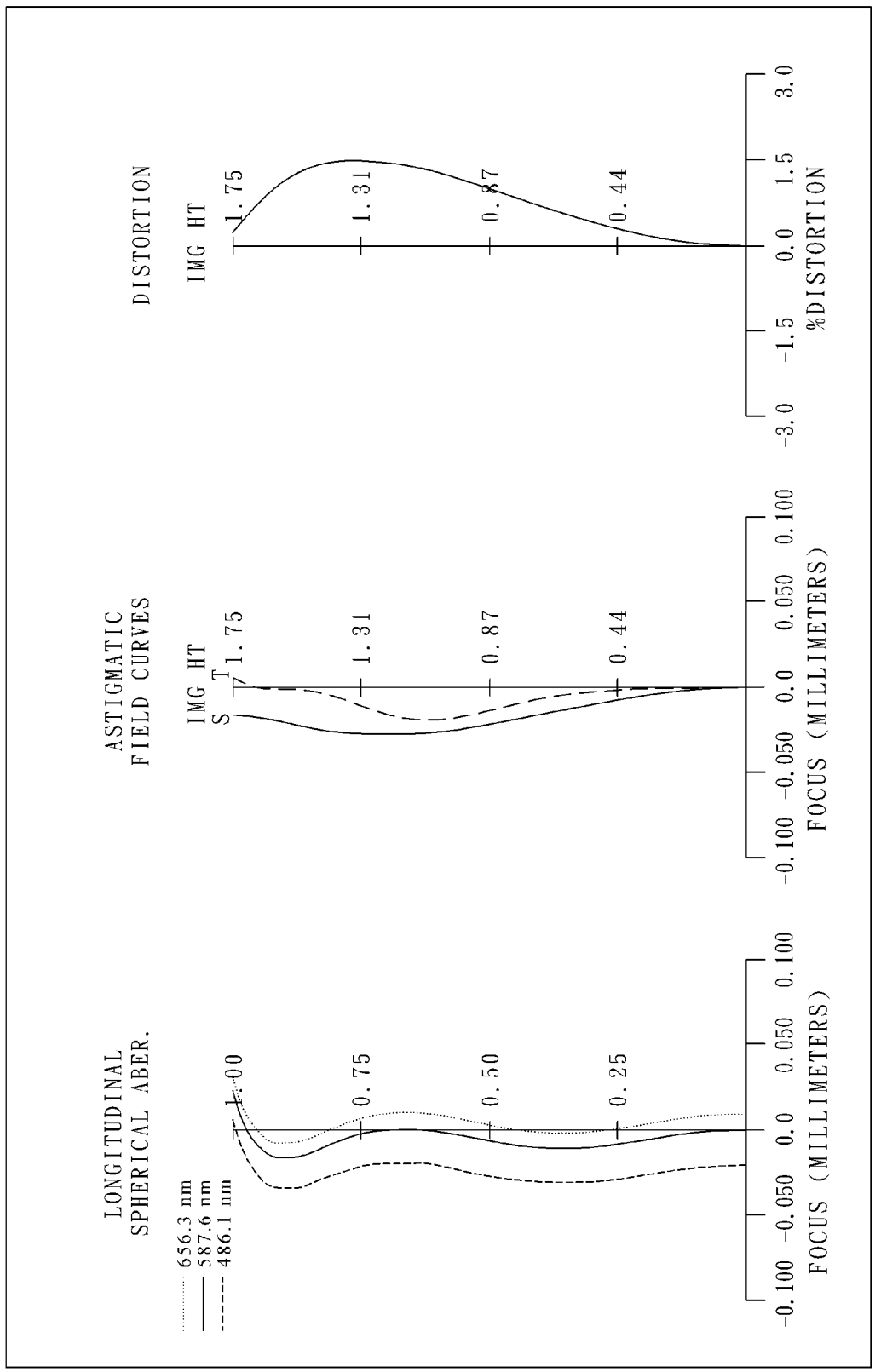
FIG. 7B shows the aberration curves of the seventh embodiment of the present disclosure.

FIG. 7A shows an imaging lens system in accordance with the seventh embodiment of the present disclosure, and FIG. 7B shows the aberration curves of the seventh embodiment of the present disclosure. The imaging lens system of the seventh embodiment of the present disclosure comprises three lens elements, in order from an object side to an image side:

a first lens element 710 made of plastic with positive refractive power having a convex object-side surface 711 and a convex image-side surface 712, the object-side and image-side surfaces 711 and 712 thereof being aspheric;

a second lens element 720 made of plastic with negative refractive power having a concave object-side surface 721 and a convex image-side surface 722, the object-side and image-side surfaces 721 and 722 thereof being aspheric; and a third lens element 730 made of plastic with negative refractive power having a convex object-side surface 731 and a concave image-side surface 732, the object-side and image-side surfaces 731 and 732 thereof being aspheric, and at least one inflection point is formed on the object-side surface 731 and the image-side surface 732 thereof;

wherein there are three lens elements with refractive power in the imaging lens system, which are the first lens element 710, the second lens element 720 and the third lens element 730 respectively; and the second lens element 720 has the greatest central thickness among the three lens elements 710, 720 and 730;

wherein an aperture stop 700 is disposed between the first lens element 710 and the second lens element 720;

the imaging lens system further comprises an IR filter 740 disposed between the image-side surface 732 of the third lens element 730 and an image plane 750, and the IR filter 740 is made of glass and has no influence on the focal length of the imaging lens system.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

(Embodiment 7)
f = 3.21 mm, Fno = 2.40, HFOV = 28.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens | 1.467 | (ASP) | 0.517 | Plastic | 1.544 | 55.9 | 2.48 |
| 2 | 1 | -14.756 | (ASP) | -0.025 | | | | |
| 3 | Ape. Stop | Plano | | 0.488 | | | | |
| 4 | Lens | -1.395 | (ASP) | 0.647 | Plastic | 1.640 | 23.3 | -7.92 |
| 5 | 2 | -2.273 | (ASP) | 0.474 | | | | |
| 6 | Lens | 1.529 | (ASP) | 0.593 | Plastic | 1.535 | 56.3 | -204.73 |
| 7 | 3 | 1.304 | (ASP) | 0.500 | | | | |
| 8 | IR-filter | Plano | | 0.300 | Glass | 1.517 | 64.2 | — |
| 9 | | Plano | | 0.416 | | | | |
| 10 | Image | Plano | | — | | | | |

* Reference wavelength is d-line 587.6 nm

TABLE 19

| Aspheric Coefficients | | | | | | |
|---|---|---|---|---|---|---|
| Surface # | 1 | 2 | 4 | 5 | 6 | 7 |
| k = | -2.1408E-01 | -2.0000E+01 | -1.8564E-01 | -1.4667E+01 | -5.1379E+00 | -3.8197E+00 |
| A4 = | -2.9157E-02 | -1.3079E-01 | -7.3048E-03 | -2.1476E-01 | -1.9450E-01 | -1.3768E-01 |
| A6 = | -1.6514E-01 | 3.7672E-02 | 2.8153E-02 | 5.0286E-01 | 1.2949E-01 | 5.6260E-02 |
| A8 = | 2.7742E-01 | -5.3640E-01 | 9.2834E-01 | -3.1312E-01 | -6.1270E-02 | -1.3962E-02 |
| A10 = | -5.6145E-01 | 4.6400E-01 | -2.4148E+00 | 9.9979E-02 | 1.4813E-02 | -3.3126E-03 |
| A12 = | | | 2.4232E+00 | 1.9006E-01 | 1.9191E-03 | 2.1738E-03 |
| A14 = | | | -5.3313E-01 | -1.3261E-01 | -1.0531E-03 | -2.5159E-04 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

| Embodiment 7 | | | |
|---|---|---|---|
| f [mm] | 3.21 | T23/CT3 | 0.80 |
| Fno | 2.40 | (R1 + R2)/(R1 - R2) | -0.82 |
| HFOV [deg.] | 28.6 | R6/f | 0.41 |
| V2 | 23.3 | f/f2 | -0.41 |
| CT1/CT2 | 0.80 | f/f3 | -0.02 |
| CT3/CT2 | 0.92 | f2/f3 | 0.04 |
| CT1 + CT2 + CT3 [mm] | 1.76 | SD/TD | 0.82 |
| T12/T23 | 0.98 | | |

Embodiment 8

Figure 8A:
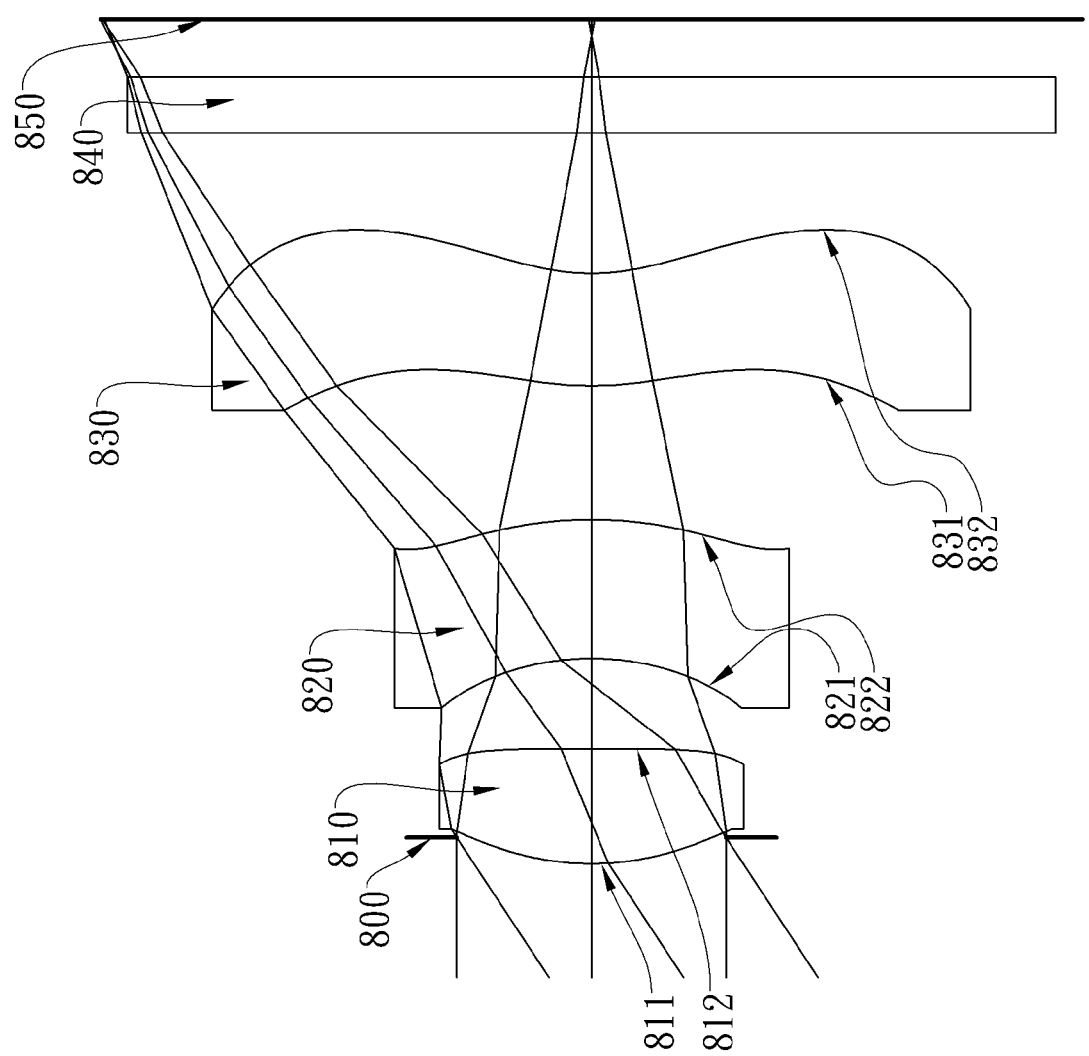
FIG. 8A shows an imaging lens system in accordance with an eighth embodiment of the present disclosure.
Figure 8B:
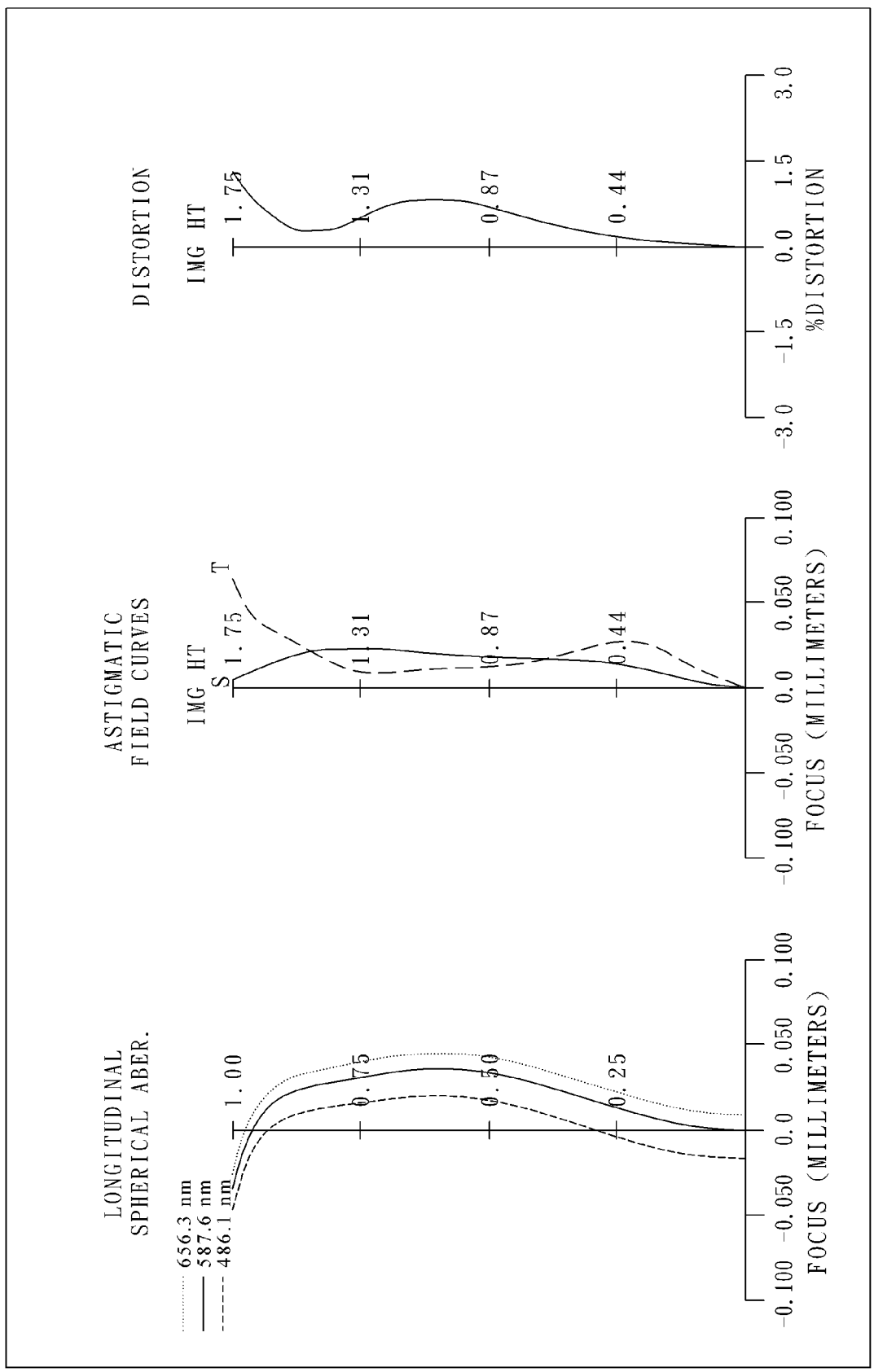
FIG. 8B shows the aberration curves of the eighth embodiment of the present disclosure.

FIG. 8A shows an imaging lens system in accordance with the eighth embodiment of the present disclosure, and FIG. 8B shows the aberration curves of the eighth embodiment of the present disclosure. The imaging lens system of the eighth embodiment of the present disclosure comprises three lens elements, in order from an object side to an image side:

a first lens element 810 made of plastic with positive refractive power having a convex object-side surface 811 and a convex image-side surface 812, the object-side and image-side surfaces 811 and 812 thereof being aspheric;

a second lens element 820 made of plastic with negative refractive power having a concave object-side surface 821 and a convex image-side surface 822, the object-side and image-side surfaces 821 and 822 thereof being aspheric; and a third lens element 830 made of plastic with negative refractive power having a convex object-side surface 831 and a concave image-side surface 832, the object-side and image-side surfaces 831 and 832 thereof being aspheric, and at least one inflection point is formed on the object-side surface 831 and the image-side surface 832 thereof;

wherein there are three lens elements with refractive power in the imaging lens system, which are the first lens element 810, the second lens element 820 and the third lens element 830 respectively; and the second lens element 820 has the greatest central thickness among the three lens elements 810, 820 and 830;

wherein an aperture stop 800 is disposed between an imaged object and the first lens element 810;

the imaging lens system further comprises an IR filter 840 disposed between the image-side surface 832 of the third lens element 830 and an image plane 850, and the IR filter 840 is made of glass and has no influence on the focal length of the imaging lens system.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

(Embodiment 8)
f = 2.61 mm, Fno = 2.72, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.093 | | | | |
| 2 | Lens 1 | 0.987 (ASP) | 0.410 | Plastic | 1.530 | 55.8 | 1.85 |
| 3 | | −100.000 (ASP) | 0.322 | | | | |
| 4 | Lens 2 | −0.985 (ASP) | 0.496 | Plastic | 1.650 | 21.4 | −8.16 |
| 5 | | −1.450 (ASP) | 0.477 | | | | |
| 6 | Lens 3 | 1.126 (ASP) | 0.401 | Plastic | 1.530 | 55.8 | −6.33 |
| 7 | | 0.739 (ASP) | 0.500 | | | | |
| 8 | IR-filter | Plano | 0.200 | Glass | 1.517 | 64.2 | — |
| 9 | | Plano | 0.206 | | | | |
| 10 | Image | Plano | — | | | | |

* Reference wavelength is d-line 587.6 nm

TABLE 22

Aspheric Coefficients

| Surface # | 2 | 3 | 4 | 5 | 6 | 7 |
|---|---|---|---|---|---|---|
| k = | −1.4900E+00 | −1.0000E+00 | −3.8768E−01 | 1.3348E−01 | −1.2630E+01 | −5.9590E+00 |
| A4 = | 1.1522E−01 | −2.3930E−01 | −3.3708E−01 | −1.1208E−01 | −4.6258E−01 | −2.9224E−01 |
| A6 = | −9.0178E−02 | −9.0803E−01 | 1.4159E+00 | 9.9235E−01 | 3.04628E−01 | 2.0636E−01 |
| A8 = | −2.0128E−01 | 1.0110E+00 | −4.3515E+00 | −1.4592E−01 | −8.0806E−02 | −1.3645E−01 |
| A10 = | −3.6364E+00 | −8.9255E+00 | −4.8097E+00 | −8.9992E−01 | −2.4213E−02 | 3.6357E−02 |
| A12 = | −5.3426E+00 | 2.3413E+00 | 1.6791E+01 | 2.7428E+00 | 7.6497E−03 | 2.2923E−03 |
| A14 = | | | −9.5474E+00 | −2.1961E+00 | 5.0261E−03 | −2.8121E−03 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

Embodiment 8

| f [mm] | 2.61 | T23/CT3 | 1.19 |
|---|---|---|---|
| Fno | 2.72 | (R1 + R2)/(R1 − R2) | −0.98 |
| HFOV [deg.] | 33.3 | R6/f | 0.28 |
| V2 | 21.4 | f/f2 | −0.32 |
| CT1/CT2 | 0.83 | f/f3 | −0.41 |
| CT3/CT2 | 0.81 | f2/f3 | 1.29 |
| CT1 + CT2 + CT3 [mm] | 1.31 | SD/TD | 0.96 |
| T12/T23 | 0.68 | | |

Embodiment 9

Figure 9A:
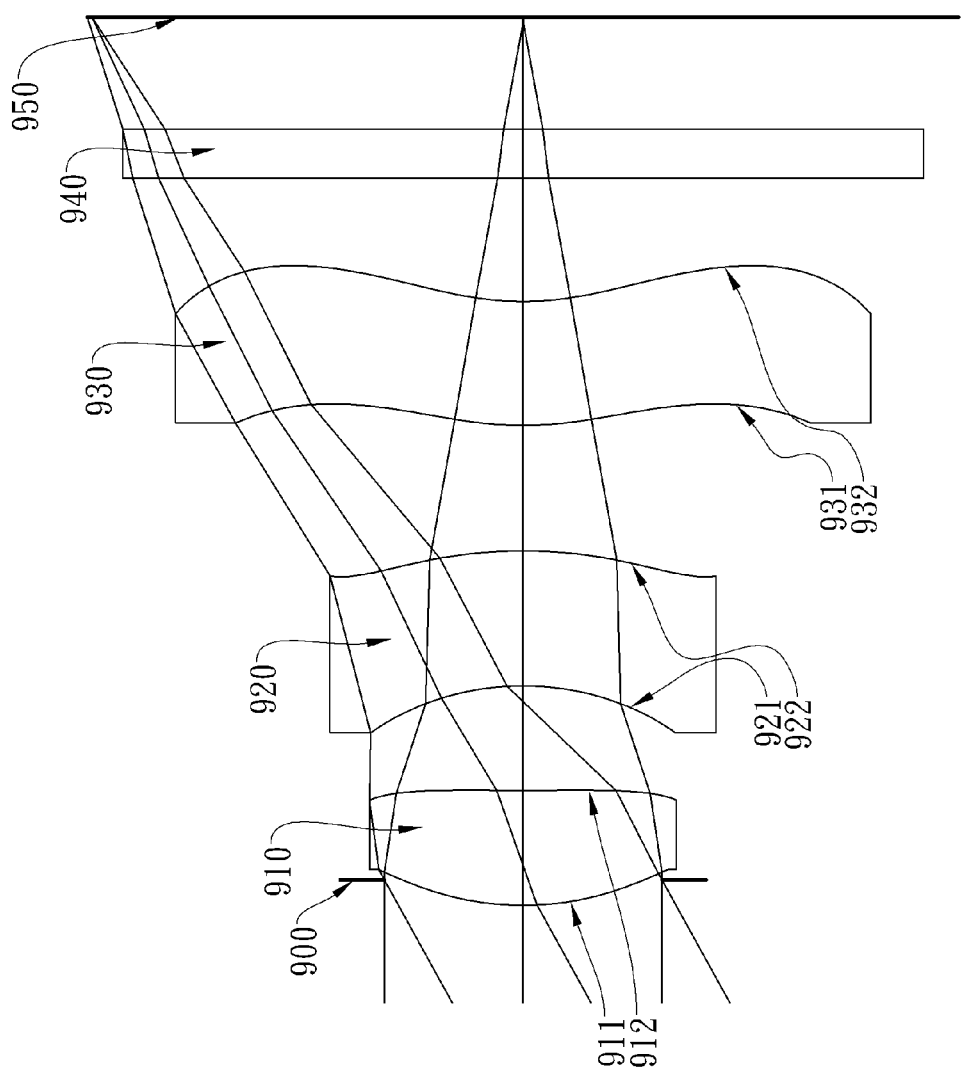
FIG. 9A shows an imaging lens system in accordance with a ninth embodiment of the present disclosure.
Figure 9B:
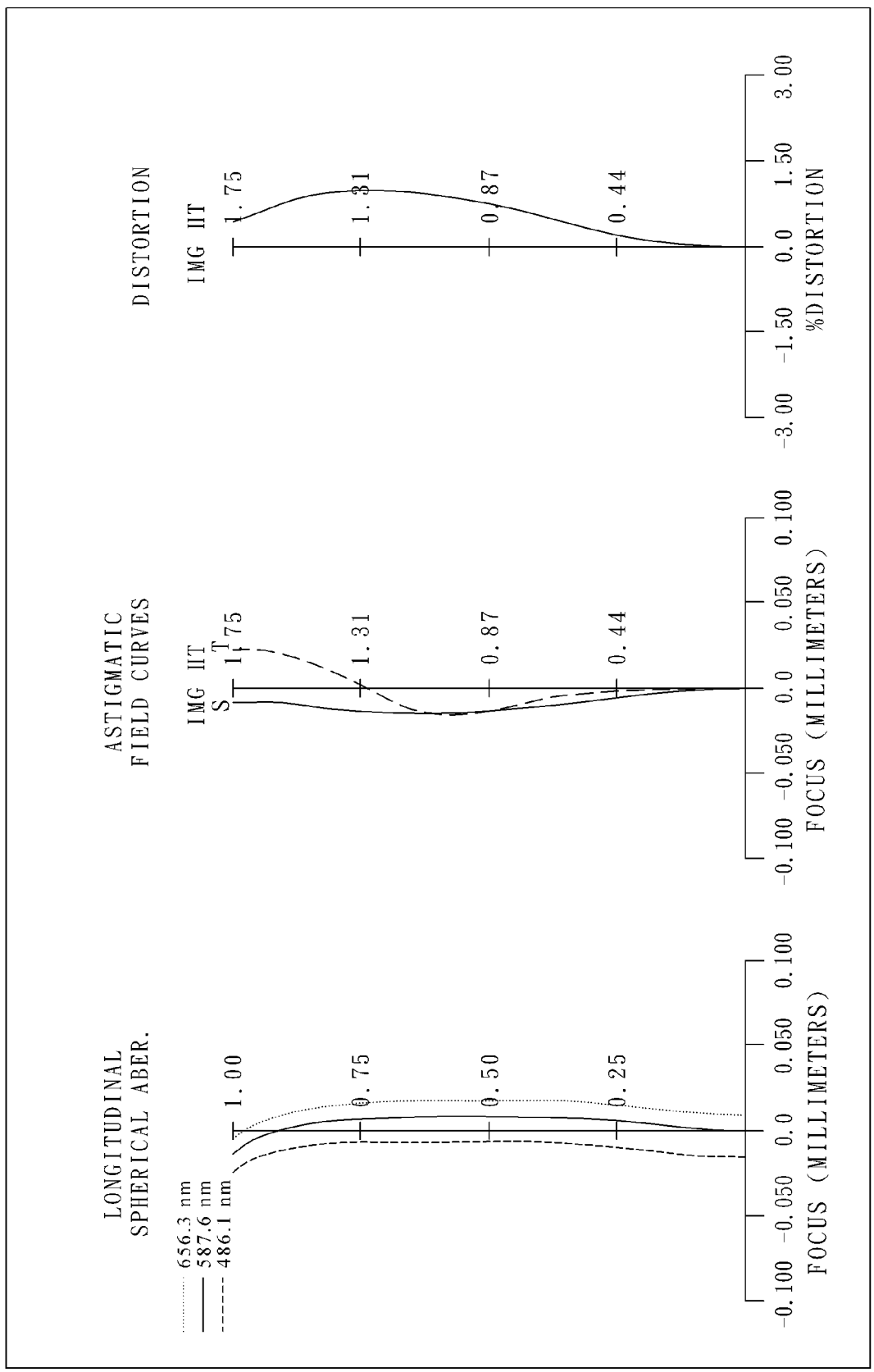
FIG. 9B shows the aberration curves of the ninth embodiment of the present disclosure.

FIG. 9A shows an imaging lens system in accordance with the ninth embodiment of the present disclosure, and FIG. 9B shows the aberration curves of the ninth embodiment of the present disclosure. The imaging lens system of the ninth embodiment of the present disclosure comprises three lens elements, in order from an object side to an image side:

a first lens element 910 made of plastic with positive refractive power having a convex object-side surface 911 and a concave image-side surface 912, the object-side and image-side surfaces 911 and 912 thereof being aspheric;

a second lens element 920 made of plastic with negative refractive power having a concave object-side surface 921 and a convex image-side surface 922, the object-side and image-side surfaces 921 and 922 thereof being aspheric; and a third lens element 930 made of plastic with negative refractive power having a convex object-side surface 931 and a concave image-side surface 932, the object-side and image-side surfaces 931 and 932 thereof being aspheric, and at least one inflection point is formed on the object-side surface 931 and the image-side surface 932 thereof;

wherein there are three lens elements with refractive power in the imaging lens system, which are the first lens element 910, the second lens element 920 and the third lens element 930 respectively; and the second lens element 920 has the greatest central thickness among the three lens elements 910, 920 and 930;

wherein an aperture stop 900 is disposed between an imaged object and the first lens element 910;

the imaging lens system further comprises an IR filter 940 disposed between the image-side surface 932 of the third lens element 930 and an image plane 950, and the IR filter 940 is made of glass and has no influence on the focal length of the imaging lens system.

The detailed optical data of the ninth embodiment is shown in TABLE 24, and the aspheric surface data is shown in TABLE 25, wherein the units of the curvature radius, the thickness and the focal length are expressed in mm, and HFOV is half of the maximal field of view.

TABLE 24

(Embodiment 9)
f = 3.16 mm, Fno = 2.80, HFOV = 28.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.104 | | | | |
| 2 | Lens 1 | 1.170 | (ASP) | 0.467 | Plastic | 1.544 | 55.9 | 2.22 |
| 3 | | 30.769 | (ASP) | 0.425 | | | | |
| 4 | Lens 2 | −1.149 | (ASP) | 0.549 | Plastic | 1.650 | 21.4 | −5.74 |
| 5 | | −1.974 | (ASP) | 0.510 | | | | |
| 6 | Lens 3 | 1.389 | (ASP) | 0.503 | Plastic | 1.530 | 55.8 | −48.11 |
| 7 | | 1.152 | (ASP) | 0.500 | | | | |
| 8 | IR-filter | Plano | | 0.200 | Glass | 1.517 | 64.2 | — |
| 9 | | Plano | | 0.455 | | | | |
| 10 | Image | Plano | | — | | | | |

* Reference wavelength is d-line 587.6 nm

TABLE 25

| | Aspheric Coefficients | | | | | |
|---|---|---|---|---|---|---|
| Surface # | 2 | 3 | 4 | 5 | 6 | 7 |
| k = | −1.8460E+00 | −1.0000E+00 | −1.3298E+00 | 9.2205E−01 | −3.6175E+00 | −4.3872E+00 |
| A4 = | 9.8716E−02 | −1.2242E−01 | −1.9827E−01 | −8.8045E−02 | −4.0544E−01 | −2.4812E−01 |
| A6 = | 7.0786E−02 | −4.0822E−01 | −9.5763E−02 | 4.1830E−01 | 2.8734E−01 | 1.4354E−01 |
| A8 = | −1.1355E+00 | 8.7071E−01 | 2.3661E+00 | 2.4071E−01 | −1.0418E−01 | −6.3755E−02 |
| A10 = | 3.1732E+00 | −3.5002E+00 | −1.0369E+01 | −8.4200E−01 | −8.8760E−03 | 1.0584E−02 |
| A12 = | −5.3578E+00 | 2.3896E+00 | 1.6656E+01 | 9.0885E−01 | 1.0902E−02 | 5.3981E−04 |
| A14 = | | | −9.4081E+00 | −1.6664E−01 | 2.1158E−04 | −4.8292E−04 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

| Embodiment 9 | | | |
|---|---|---|---|
| f [mm] | 3.16 | T23/CT3 | 1.01 |
| Fno | 2.80 | (R1 + R2)/(R1 − R2) | −1.08 |
| HFOV [deg.] | 28.9 | R6/f | 0.37 |
| V2 | 21.4 | f/f2 | −0.55 |
| CT1/CT2 | 0.85 | f/f3 | −0.07 |
| CT3/CT2 | 0.92 | f2/f3 | 0.12 |
| CT1 + CT2 + CT3 [mm] | 1.52 | SD/TD | 0.96 |
| T12/T23 | 0.83 | | |

Embodiment 10

Figure 10A:
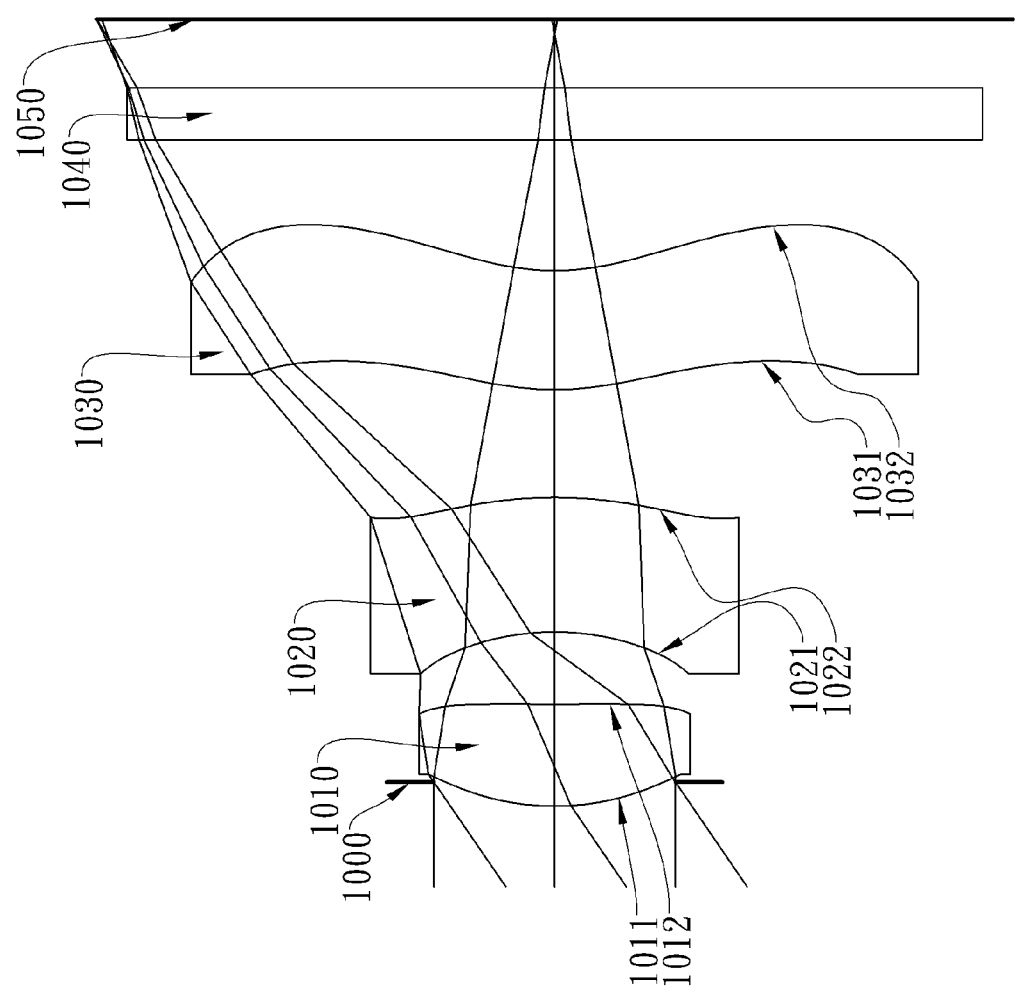
FIG. 10A shows an imaging lens system in accordance with an eleventh embodiment of the present disclosure.
Figure 10B:
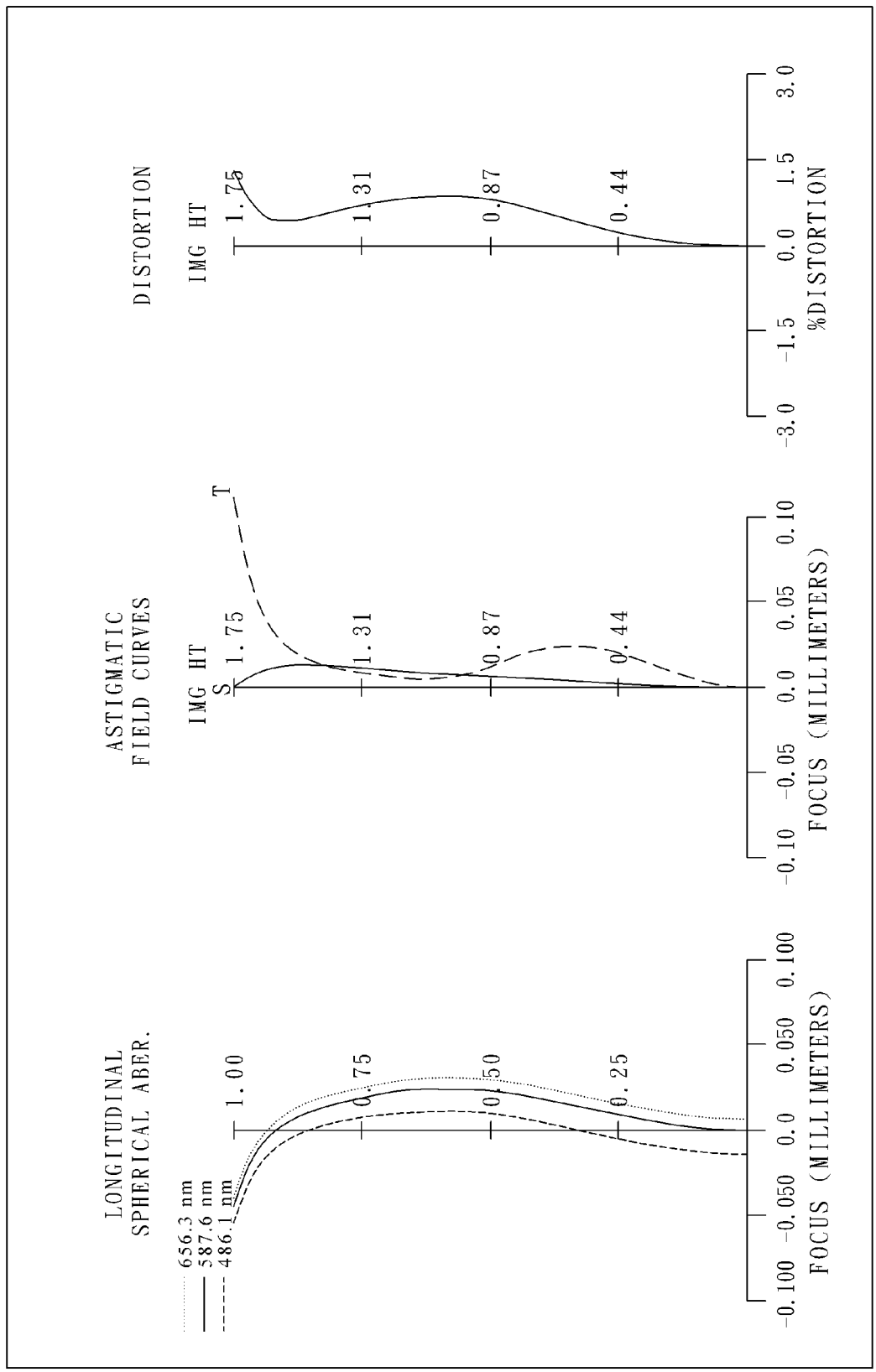
FIG. 10B shows the aberration curves of the eleventh embodiment of the present disclosure.

FIG. 10A shows an imaging lens system in accordance with the tenth embodiment of the present disclosure, and FIG. 10B shows the aberration curves of the tenth embodiment of the present disclosure. The imaging lens system of the tenth embodiment of the present disclosure comprises three lens elements, in order from an object side to an image side:

a first lens element 1010 made of plastic with positive refractive power having a convex object-side surface 1011 and a concave image-side surface 1012, the object-side and image-side surfaces 1011 and 1012 thereof being aspheric;

a second lens element 1020 made of plastic with negative refractive power having a concave object-side surface 1021 and a convex image-side surface 1022, the object-side and image-side surfaces 1021 and 1022 thereof being aspheric; and a third lens element 1030 made of plastic with negative refractive power having a convex object-side surface 1031 and a concave image-side surface 1032, the object-side and image-side surfaces 1031 and 1032 thereof being aspheric, and at least one inflection point is formed on the object-side surface 1031 and the image-side surface 1032 thereof;

wherein there are three lens elements with refractive power in the imaging lens system, which are the first lens element 1010, the second lens element 1020 and the third lens element 1030 respectively; and the second lens element 1020 has the greatest central thickness among the three lens elements 1010, 1020 and 1030;

wherein an aperture stop 1000 is disposed between an imaged object and the first lens element 1010;

the imaging lens system further comprises an IR filter 1040 disposed between the image-side surface 1032 of the third lens element 1030 and an image plane 1050, and the IR filter 1040 is made of glass and has no influence on the focal length of the imaging lens system.

The detailed optical data of the tenth embodiment is shown in TABLE 27, and the aspheric surface data is shown in TABLE 28, wherein the units of the curvature radius, the thickness and the focal length are expressed in mm, and HFOV is half of the maximal field of view.

TABLE 27

(Embodiment 10)
f = 2.51 mm, Fno = 2.72, HFOV = 34.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.092 | | | | |
| 2 | Lens | 0.968 | (ASP) | 0.389 | Plastic | 1.544 | 55.9 | 1.83 |
| 3 | 1 | 30.558 | (ASP) | 0.277 | | | | |
| 4 | Lens | −1.025 | (ASP) | 0.514 | Plastic | 1.640 | 23.3 | −5.08 |
| 5 | 2 | −1.790 | (ASP) | 0.413 | | | | |
| 6 | Lens | 1.083 | (ASP) | 0.455 | Plastic | 1.530 | 55.8 | −57.60 |
| 7 | 3 | 0.894 | (ASP) | 0.500 | | | | |
| 8 | IR- | Plano | | 0.200 | Glass | 1.517 | 64.2 | — |
| 9 | filter | Plano | | 0.261 | | | | |
| 10 | Image | Plano | | 0.000 | | | | |

* Reference wavelength is d-line 587.6 nm

TABLE 28

Aspheric Coefficients

| Surface # | 2 | 3 | 4 | 5 | 6 | 7 |
|---|---|---|---|---|---|---|
| k = | −1.2751E+00 | −1.0000E+00 | −6.8914E−01 | 3.0080E−01 | −5.7201E+00 | −4.5160E+00 |
| A4 = | 1.4135E−01 | −1.8418E−01 | −2.9820E−01 | −1.1140E−01 | −3.7950E−01 | −2.5761E−01 |
| A6 = | 5.7109E−02 | −6.1219E−01 | 1.3327E+00 | 9.4231E−01 | 2.9635E−01 | 1.5535E−01 |
| A8 = | −4.0546E−01 | −1.1894E+00 | −4.1887E+00 | 5.0448E−01 | −9.7440E−02 | −7.5035E−02 |
| A10 = | −3.2133E+00 | −1.1526E+01 | −1.4291E+01 | −1.2902E+00 | −1.5874E−02 | 1.5048E−02 |
| A12 = | −5.3426E+00 | 2.3413E+00 | 1.6791E+01 | 1.4906E+00 | 7.6239E−03 | −5.4880E−04 |
| A14 = | | | −9.5474E+00 | −4.0852E−01 | 1.9822E−03 | −6.2454E−04 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

Embodiment 10

| f [mm] | 2.51 | T23/CT3 | 0.91 |
|---|---|---|---|
| Fno | 2.72 | (R1 + R2)/(R1 − R2) | −1.07 |
| HFOV [deg.] | 34.4 | R6/f | 0.36 |
| V2 | 23.3 | f/f2 | −0.49 |
| CT1/CT2 | 0.76 | f/f3 | −0.04 |
| CT3/CT2 | 0.89 | f2/f3 | 0.09 |
| CT1 + CT2 + CT3 [mm] | 1.36 | SD/TD | 0.96 |
| T12/T23 | 0.67 | | |

Embodiment 11

Figure 11A:
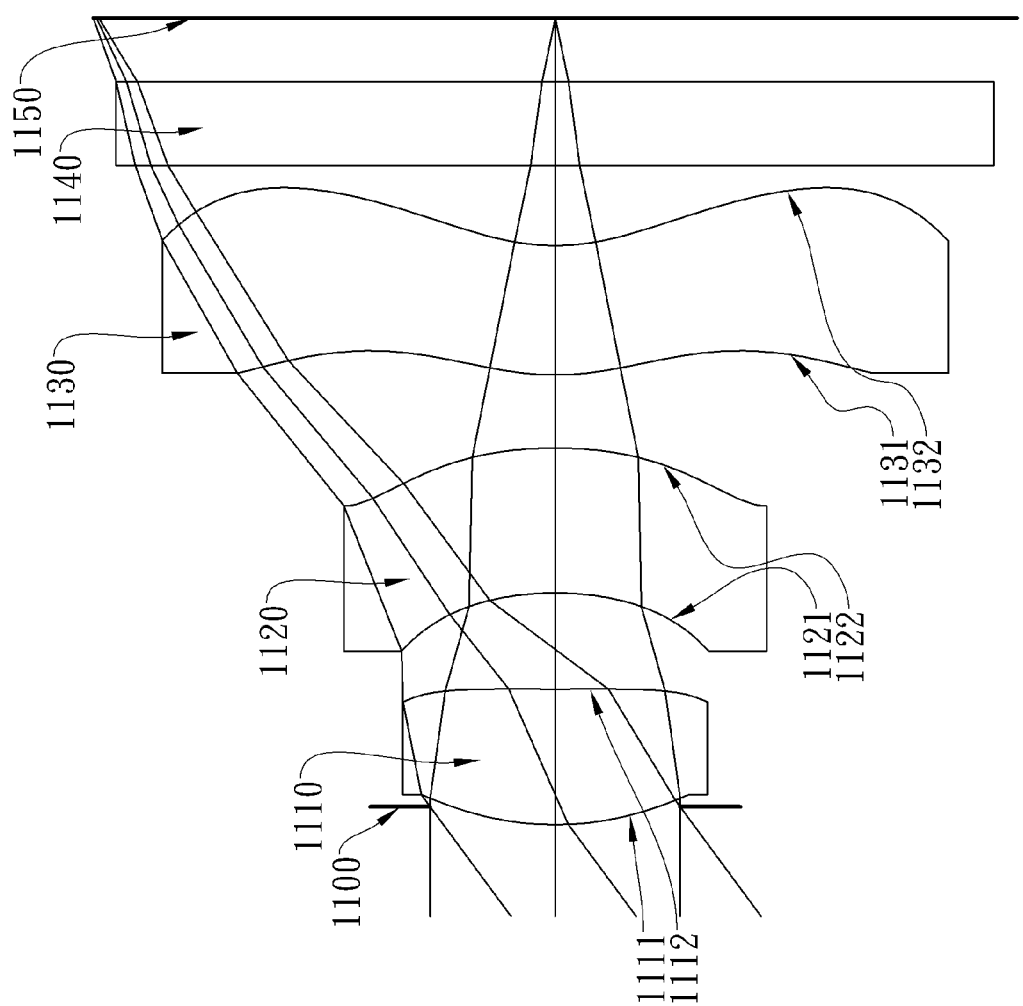
FIG. 11A shows an imaging lens system in accordance with an eleventh embodiment of the present disclosure.
Figure 11B:
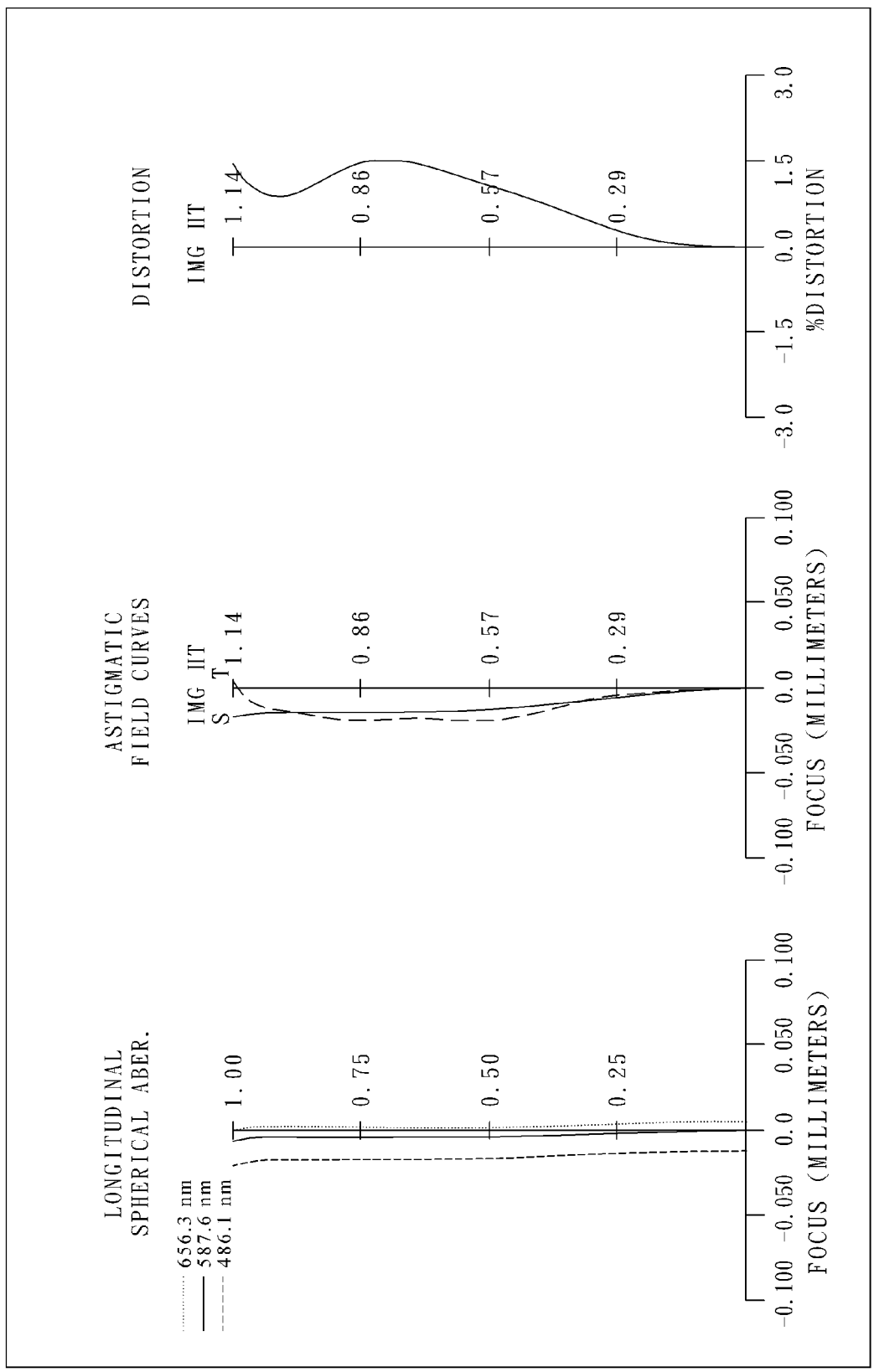
FIG. 11B shows the aberration curves of the eleventh embodiment of the present disclosure.

FIG. 11A shows an imaging lens system in accordance with the eleventh embodiment of the present disclosure, and FIG. 11B shows the aberration curves of the eleventh embodiment of the present disclosure. The imaging lens system of the eleventh embodiment of the present disclosure comprises three lens elements, in order from an object side to an image side:

a first lens element 1110 made of plastic with positive refractive power having a convex object-side surface 1111 and a concave image-side surface 1112, the object-side and image-side surfaces 1111 and 1112 thereof being aspheric;

a second lens element 1120 made of plastic with negative refractive power having a concave object-side surface 1121 and a convex image-side surface 1122, the object-side and image-side surfaces 1121 and 1122 thereof being aspheric; and a third lens element 1130 made of plastic with negative refractive power having a convex object-side surface 1131 and a concave image-side surface 1132, the object-side and image-side surfaces 1131 and 1132 thereof being aspheric, and at least one inflection point is formed on the object-side surface 1131 and the image-side surface 1132 thereof;

wherein there are three lens elements with refractive power in the imaging lens system, which are the first lens element 1110, the second lens element 1120 and the third lens element 1130 respectively; and the second lens element 1120 has the greatest central thickness among the three lens elements 1110, 1120 and 1130;

wherein an aperture stop 1100 is disposed between an imaged object and the first lens element 1110;

the imaging lens system further comprises an IR filter 1140 disposed between the image-side surface 1132 of the third lens element 1130 and an image plane 1150, and the IR filter 1140 is made of glass and has no influence on the focal length of the imaging lens system.

The detailed optical data of the eleventh embodiment is shown in TABLE 30, and the aspheric surface data is shown in TABLE 31, wherein the units of the curvature radius, the thickness and the focal length are expressed in mm, and HFOV is half of the maximal field of view.

TABLE 30

(Embodiment 11)
f = 1.54 mm, Fno = 2.46, HFOV = 36.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.045 | | | | |
| 2 | Lens | 0.740 | (ASP) | 0.339 | Plastic | 1.544 | 55.9 | 1.40 |
| 3 | 1 | 23.529 | (ASP) | 0.241 | | | | |
| 4 | Lens | −0.755 | (ASP) | 0.363 | Plastic | 1.640 | 23.3 | −9.04 |
| 5 | 2 | −1.032 | (ASP) | 0.183 | | | | |
| 6 | Lens | 0.664 | (ASP) | 0.324 | Plastic | 1.544 | 55.9 | −59.91 |
| 7 | 3 | 0.539 | (ASP) | 0.200 | | | | |
| 8 | IR- | Plano | | 0.210 | Glass | 1.517 | 64.2 | — |
| 9 | filter | Plano | | 0.160 | | | | |
| 10 | Image | Plano | | | | | | |

* Reference wavelength is d-line 587.6 nm

TABLE 31

| Aspheric Coefficients | | | | | | |
|---|---|---|---|---|---|---|
| Surface # | 2 | 3 | 4 | 5 | 6 | 7 |
| k = | −1.1092E+00 | −1.0000E+00 | −3.8605E−01 | 1.2788E+00 | −3.7394E+00 | −3.0923E+00 |
| A4 = | 1.2654E−01 | −7.1739E−01 | −5.5079E−01 | −1.4519E+00 | −2.3553E+00 | −1.2931E+00 |
| A6 = | −5.5814E−01 | −4.5742E+00 | −2.5688E+01 | 8.1134E+00 | 5.6135E+00 | 2.6392E+00 |
| A8 = | 7.3215E+00 | 6.2863E+00 | 2.7819E+02 | −2.6388E+01 | −8.1451E+00 | −3.4433E+00 |
| A10 = | −1.3923E+02 | −2.1386E+02 | −1.7984E+03 | 9.1722E+01 | 6.6607E+00 | 4.6098E−01 |
| A12 = | 1.4674E+02 | 4.7403E+02 | 4.3152E+03 | −9.1281E+01 | −2.1925E+00 | −1.0981E+00 |
| A14 = | | | | 4.0462E+01 | | 4.1312E−01 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

| Embodiment 11 | | | |
|---|---|---|---|
| f [mm] | 1.54 | T23/CT3 | 0.56 |
| Fno | 2.46 | (R1 + R2)/(R1 − R2) | −1.06 |
| HFOV [deg.] | 36.4 | R6/f | 0.35 |
| V2 | 23.3 | f/f2 | −0.17 |
| CT1/CT2 | 0.93 | f/f3 | −0.03 |
| CT3/CT2 | 0.89 | f2/f3 | 0.15 |
| CT1 + CT2 + CT3 [mm] | 1.03 | SD/TD | 0.97 |
| T12/T23 | 1.32 | | |

It is to be noted that TABLES 1-32 show different data of the different embodiments, however, the data of the different embodiments are obtained from experiments. Therefore, any imaging lens system of the same structure is considered to be within the scope of the present disclosure even if it uses different data. The embodiments depicted above and the appended drawings are exemplary and are not intended to limit the scope of the present disclosure.

What is claimed is:

1. An imaging lens system comprising, in order from an object side to an image side:
    a first lens element with positive refractive power;
    a plastic second lens element with negative refractive power having a concave object-side surface and a convex image-side surface, both surfaces thereof being aspheric; and
    a plastic third lens element with negative refractive power having a convex object-side surface and a concave image-side surface, both surfaces thereof being aspheric, and at least one inflection point is formed on at least one of the object-side and image-side surfaces thereof;
    wherein there are three lens elements with refractive power in the imaging lens system; the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an axial distance between the second lens element and the third lens element is T23, and they satisfy the following relations:

$0.35 < CT1/CT2 < 1.00;$ $0.35 < CT3/CT2 < 1.00;$ $-3.0 < (R1+R2)/(R1-R2) < 0;$ and $0.65 < T23/CT3 < 1.80.$ 2. The imaging lens system according to claim 1, wherein the curvature radius of the object-side surface of the first lens element is R1, the curvature radius of the image-side surface of the first lens element is R2, and they satisfy the following relation:

$-2.5 < (R1+R2)/(R1-R2) < -0.5.$

3. The imaging lens system according to claim 2, wherein a focal length of the imaging lens system is f, a focal length of the third lens element is f3, and they satisfy the following relation:

$-0.45 < f/f3 < 0.$

4. The imaging lens system according to claim 3, further comprising a stop, an axial distance between the stop and the image-side surface of the third lens element is Sd, an axial distance between the object-side surface of the first lens element and the image-side surface of the third lens element is Td, and they satisfy the following relation:

$0.65 < Sd/Td < 0.90.$

5. The imaging lens system according to claim 1, wherein a focal length of the second lens element is f2, a focal length of the third lens element is f3, and they satisfy the following relation:

$0 < f2/f3 < 0.75.$

6. The imaging lens system according to claim 5, wherein an axial distance between the first lens element and the second lens element is T12, the axial distance between the second lens element and the third lens element is T23, and they satisfy the following relation:

$0.5 < T12/T23 < 1.55.$

7. The imaging lens system according to claim 5, wherein a focal length of the imaging lens system is f, the focal length of the second lens element is f2, and they satisfy the following relation:

$-0.70 < f/f2 < -0.25.$

8. The imaging lens system according to claim 1, wherein a curvature radius of the image-side surface of the third lens element is R6, a focal length of the imaging lens system is f, and they satisfy the following relation:

$0.1 < R6/f < 0.6.$

9. The imaging lens system according to claim 1, wherein the central thickness of the first lens element is CT1, the central thickness of the second lens element is CT2, the central thickness of the third lens element is CT3, and they satisfy the following relations:

$$0.50 < CT1/CT2 < 0.94;$$

$$0.50 < CT3/CT2 < 0.94.$$

10. The imaging lens system according to claim 1, wherein an Abbe number of the second lens element is V2, and it satisfies the following relation:

$$15 < V2 < 24.5.$$

11. The imaging lens system according to claim 1, wherein the central thickness of the first lens element is CT1, the central thickness of the second lens element is CT2, the central thickness of the third lens element is CT3, and they satisfy the following relation:

$$0.80 \text{ mm} < CT1+CT2+CT3 < 1.85 \text{ mm}.$$

12. An imaging lens system comprising, in order from an object side to an image side:
   a first lens element with positive refractive power;
   a plastic second lens element with negative refractive power having a concave object-side surface and a convex image-side surface, both surfaces thereof being aspheric; and
   a plastic third lens element with negative refractive power having a convex object-side surface and a concave image-side surface, both surfaces thereof being aspheric, and at least one inflection point is formed on at least one of the object-side and image-side surfaces thereof;
   wherein there are three lens elements with refractive power in the imaging lens system; the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an axial distance between the first lens element and the second lens element is T12, an axial distance between the second lens element and the third lens element is T23, and they satisfy the following relations:

$$0.35 < CT1/CT2 < 1.00;$$

$$0.35 < CT3/CT2 < 1.00;$$

$$-3.0 < (R1+R2)/(R1-R2) < 0; \text{ and}$$

$$0.5 < T12/T23 < 1.55.$$

13. The imaging lens system according to claim 12, wherein the curvature radius of the object-side surface of the first lens element is R1, the curvature radius of the image-side surface of the first lens element is R2, and they satisfy the following relation:

$$-2.5 < (R1+R2)/(R1-R2) < -0.5.$$

14. The imaging lens system according to claim 13, further comprising a stop, an axial distance between the stop and the image-side surface of the third lens element is Sd, an axial distance between the object-side surface of the first lens element and the image-side surface of the third lens element is Td, and they satisfy the following relation:

$$0.65 < Sd/Td < 0.90.$$

15. The imaging lens system according to claim 14, wherein a focal length of the second lens element is f2, a focal length of the third lens element is f3, and they satisfy the following relation:

$$0 < f2/f3 < 0.75.$$

16. The imaging lens system according to claim 14, wherein a focal length of the imaging lens system is f, a focal length of the second lens element is f2, and they satisfy the following relation:

$$-0.70 < f/f2 < -0.25.$$

17. The imaging lens system according to claim 12, wherein a curvature radius of the image-side surface of the third lens element is R6, a focal length of the imaging lens system is f, and they satisfy the following relation:

$$0.1 < R6/f < 0.6.$$

18. The imaging lens system according to claim 12, wherein the central thickness of the first lens element is CT1, the central thickness of the second lens element is CT2, and they satisfy the following relation:

$$0.50 < CT1/CT2 < 0.94.$$

19. The imaging lens system according to claim 12, wherein the central thickness of the first lens element is CT1, the central thickness of the second lens element is CT2, the central thickness of the third lens element is CT3, and they satisfy the following relation:

$$0.80 \text{ mm} < CT1+CT2+CT3 < 1.85 \text{ mm}.$$

20. An imaging lens system comprising, in order from an object side to an image side:
   a first lens element with positive refractive power;
   a plastic second lens element with negative refractive power having a concave object-side surface and a convex image-side surface, both surfaces thereof being aspheric; and
   a plastic third lens element with negative refractive power having a convex object-side surface and a concave image-side surface, both surfaces thereof being aspheric, and at least one inflection point is formed on at least one of the object-side and image-side surfaces thereof;
   wherein there are three lens elements with refractive power in the imaging lens system; the second lens element has the greatest central thickness among the three lens elements; a central thickness of the first lens element is CT1, a central thickness of the second lens element is CT2, a central thickness of the third lens element is CT3, a curvature radius of the object-side surface of the first lens element is R1, a curvature radius of the image-side surface of the first lens element is R2, an Abbe number of the second lens element is V2, and they satisfy the following relations:

$$0.35 < CT1/CT2 < 1.00;$$

$$0.35 < CT3/CT2 < 1.00;$$

$$-3.0 < (R1+R2)/(R1-R2) < 0; \text{ and}$$

$$15 < V2 < 24.5.$$

21. The imaging lens system according to claim 20, wherein the central thickness of the first lens element is CT1, the central thickness of the second lens element is CT2, and they satisfy the following relation:

$$0.50 < CT1/CT2 < 0.94.$$

22. The imaging lens system according to claim 20, wherein the central thickness of the first lens element is CT1, the central thickness of the second lens element is CT2, the central thickness of the third lens element is CT3, and they satisfy the following relation:

0.80 mm<CT1+$CT$2+$CT$3<1.85 mm.

23. The imaging lens system according to claim 20, wherein an axial distance between the first lens element and the second lens element is T12, an axial distance between the second lens element and the third lens element is T23, and they satisfy the following relation:

0.5<$T$12/$T$23<1.55.

* * * * *